(12) United States Patent
Gilbertson et al.

(10) Patent No.: US 10,489,832 B2
(45) Date of Patent: Nov. 26, 2019

(54) SYSTEM, METHOD, AND DEVICES FOR MANAGING RETAIL TRANSACTIONS AT A RETAIL LOCATION

(71) Applicant: 3-East, LLC, Coatesville, PA (US)

(72) Inventors: Matthew R. Gilbertson, Downingtown, PA (US); Timothy A. Freese, Coatesville, PA (US)

(73) Assignee: 3-East, LLC, Coatesville, PA (US)

( * ) Notice: Subject to any disclaimer, the term of this patent is extended or adjusted under 35 U.S.C. 154(b) by 0 days.

(21) Appl. No.: 16/053,284

(22) Filed: Aug. 2, 2018

(65) Prior Publication Data

US 2018/0341996 A1    Nov. 29, 2018

Related U.S. Application Data

(63) Continuation of application No. 15/474,705, filed on Mar. 30, 2017, now Pat. No. 10,043,202.

(60) Provisional application No. 62/315,511, filed on Mar. 30, 2016.

(51) Int. Cl.
| | | |
|---|---|---|
| G06K 15/00 | (2006.01) | |
| G06Q 30/00 | (2012.01) | |
| G06Q 30/06 | (2012.01) | |
| G06Q 20/18 | (2012.01) | |
| G06Q 20/20 | (2012.01) | |
| G07D 11/22 | (2019.01) | |
| G06Q 20/10 | (2012.01) | |
| G06Q 40/02 | (2012.01) | |
| G07D 11/00 | (2019.01) | |
| G06Q 10/06 | (2012.01) | |

(52) U.S. Cl.
CPC ........... *G06Q 30/06* (2013.01); *G06Q 20/108* (2013.01); *G06Q 20/18* (2013.01); *G06Q 20/20* (2013.01); *G06Q 20/206* (2013.01); *G06Q 20/208* (2013.01); *G06Q 40/02* (2013.01); *G07D 11/0093* (2013.01); *G07D 11/22* (2019.01); *G06Q 10/063* (2013.01)

(58) Field of Classification Search
CPC ...... G06Q 30/06; G06Q 20/108; G06Q 20/18; G06Q 20/20; G06Q 20/206; G06Q 20/208; G06Q 40/02; G07D 11/22; G07D 11/0093
USPC ....................................................... 235/383
See application file for complete search history.

(56) References Cited

U.S. PATENT DOCUMENTS

| | | |
|---|---|---|
| 2003/0162504 A1 | 8/2003 | Sabongi et al. |
| 2003/0200147 A1 | 10/2003 | Sabongi et al. |
| 2004/0035644 A1 | 2/2004 | Ford et al. |
| 2006/0076397 A1 | 4/2006 | Langos |
| 2006/0178943 A1 | 8/2006 | Rollinson et al. |
| 2007/0116240 A1 | 5/2007 | Foley et al. |
| 2009/0099898 A1 | 4/2009 | Ehrman et al. |
| 2013/0024299 A1 | 1/2013 | Wong et al. |
| 2013/0262275 A1 | 10/2013 | Outwater et al. |
| 2017/0262920 A1 | 9/2017 | Degraeve |

*Primary Examiner* — Daniel A Hess
(74) *Attorney, Agent, or Firm* — Bonini IP Law, LLC; Frank J. Bonini, Jr.

(57) ABSTRACT

A system, method and devices are provided for conducting retail transactions, and more particularly for transacting business with customers and clients where the point of transaction occurs at a retail facility, such as a retail banking or drug store facility. The present system, method and devices are implemented to manage logistics in retail facilities, such as retail banking and drug store establishments, that have drive-up service, and to survey and report transactional data.

22 Claims, 10 Drawing Sheets

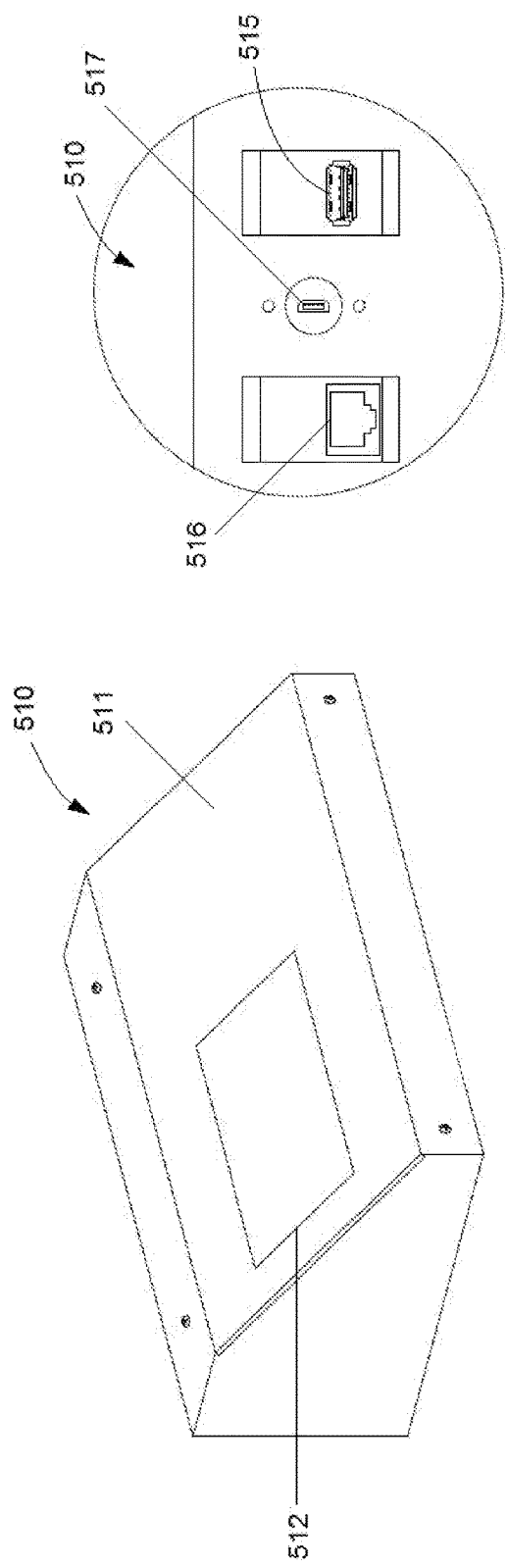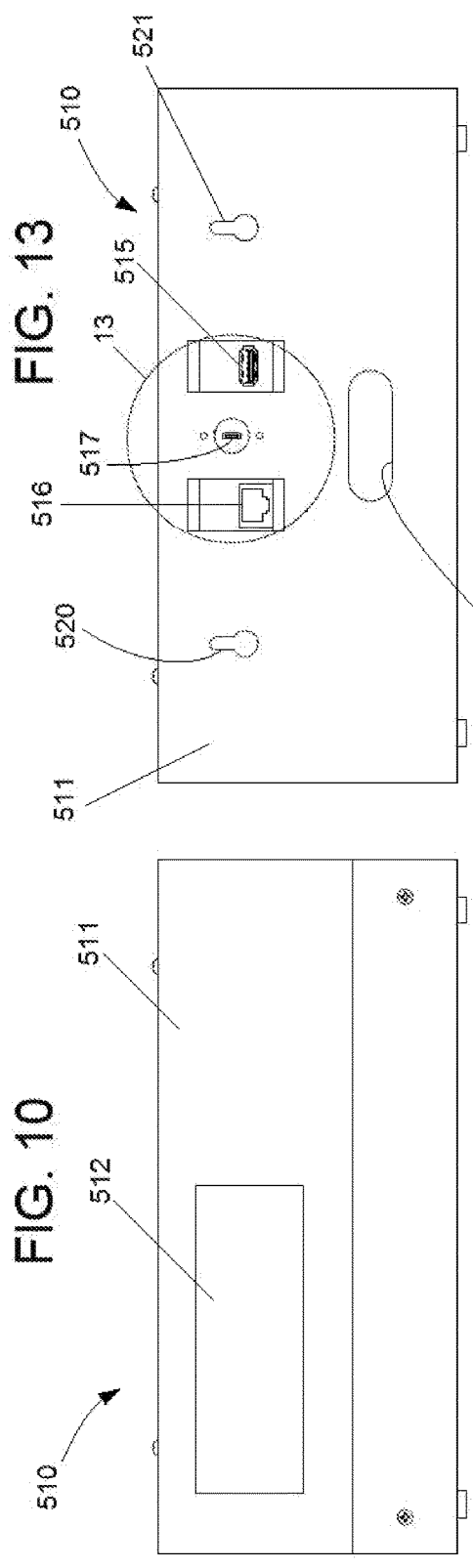

SYSTEM, METHOD, AND DEVICES FOR MANAGING RETAIL TRANSACTIONS AT A RETAIL LOCATION

CROSS-REFERENCE TO RELATED APPLICATIONS

This patent application claims the benefit under 35 U.S.C. 119 and 35 U.S.C. 120 of U.S. provisional application Ser. No. 62/315,511 entitled "System, Method, And Devices For Managing Retail Transactions At A Retail Location", filed Mar. 30, 2016, the complete contents of which is herein incorporated by reference.

BACKGROUND OF THE INVENTION

1. Field of the Invention

The invention relates to retail facilities, and more particularly to a system, method and devices for conducting customer reception and transactions at a retail facility, and in particular, retail banking, drug stores and other establishments where drive-up service is provided.

2. Brief Description of the Related Art

Retail establishments have attempted to expedite customer service and provide convenience to customers by providing service where the customer may remain in a vehicle and complete the transaction at a drive-up window or similar delivery mechanism (pneumatic tube system for example). Typically, the customer waits in the customer's vehicle, in a line, until that customer's turn. Retail banks are examples of one type of establishment that operates drive-up windows for their customers. Another example is a drug store, where a window may be provided for customers to pick up a prescription order.

Retail banking establishments are seen in locations throughout the country. Although on-line banking has served to handle a number of transactions, a number of consumer and business transactions are handled in person at a retail bank branch. A typical retail branch may include an automatic teller machine, and typically has personnel staffing a counter. Bank employees may handle a number of duties, which in some instances requires them to handle transactions within the physical branch at the counter, while at other times, the bank employee may leave the counter or window to perform another duty, which may entail assisting another customer or a fellow employee.

The physical layout of the retail banking facility often has a main area within the building where customers may complete forms, and wait in line (if a number of customers are present) and have their transaction completed at the counter or window within the bank facility. In addition, many facilities have drive-up banking capabilities where customers are serviced while remaining in their vehicles. This often may be configured where the driveway lane passes by a bank window that is staffed by one of the bank employees (within the facility). The customer is able to transact at the window, and usually there is a pass-through opening, such as a deal-drawer or pneumatic tube delivery system, through which the customer and banking employee may exchange items, such as, checks, slips, bank cards, cash and the like. In other instances, the drive-up banking may involve a lane that is remotely situated from the window of the facility, and may require the use of a carrier, where the customer can place items in a carrier. Some carriers are captive carriers whereby the carrier remains as part of the pneumatic delivery system, while other carriers are separate removable containers and typically referred to as a 'carrier'), which when placed in the pneumatic tubing, will be forwarded to the window or other counter. Retail banking facilities may have multiple drive-up lanes, where one passes a window, and where one or more others are remotely situated from the window and requires transactions to be made via carrier. In each of these instances, the customer typically remains in the customer's vehicle, and is served by the bank personnel attending to the window or drive-up units.

SUMMARY OF THE INVENTION

A system, method and devices are provided for notifying and facilitating retail transactions at a retail facility, and more particularly for transacting business with customers and clients where the point of transaction occurs at the retail facility. According to some preferred implementations, a system, method and devices are provided for notifying and facilitating retail banking transactions, and more particularly for transacting business with customers and clients where the point of transaction occurs at a retail banking facility. The present system, method and devices preferably are implemented in conjunction with retail banking facilities, and more preferably, with retail banking facilities offering a drive-up service. The system, method and devices also may be implemented in conjunction with other industries such as, for example, retail pharmacy operations.

The system includes sensing and communications components that communicate signals, and which are utilized in conjunction with customer reception and transactions. According to some embodiments, the system may be implemented to identify a customer needing service at a drive-up transacting area. The system, upon identifying the customer, then may obtain service for the customer by alerting personnel at the facility, such as, for example, one or more employees at a bank facility whose duties are to handle the customer transaction. The alerting of one or more employees may be received by a computing component in communication with a sensing component that identifies the customer presence, e.g., where the customer's vehicle enters a transaction location zone. An employee may then handle the transaction to provide the customer with a requested service.

According to preferred embodiments, the system, method and devices are configured to facilitate transactions by identifying an employee from a number of employees to handle the transactions, which according to preferred implementations may be employees handling transactions of a retail banking facility. The identification of the vehicle of a customer needing service generates an alert that is processed by a computing component at the retail banking facility. The computing component is configured with software that identifies employees and corresponding employee status. The computing component also is configured to receive a signal or trigger from a drive-up sensor that senses activity, namely, the presence of a vehicle within the service lane (preferably, an active service lane). According to some embodiments, the employee status may involve ascertaining whether an employee is present and available to handle a customer, e.g., on that employee's shift. According to other embodiments, the employee status also identifies an available employee that is able to provide assistance. In some embodiments, an employee may be identified as already engaged, for example, where the employee is assisting another customer. The system is configured to determine employee status designations and identify an employee that is not already engaged, but is available. Employee availability may be that the employee is available to handle the customer transaction and has the qualifications to do so. The designated available employee may then receive an alert that there is a customer at the service location (drive-up area) needing assistance. In some embodiments, the system and method may alert more than one employee, and an employee may respond to indicate that the responding employee will handle the customer transaction. According to some other embodiments, an employee deemed available may receive an alert that deemed available employee has been assigned to handle the customer transaction at the drive-up location. The employee may respond to confirm receipt of the instruction (and that the transaction is being addressed). Upon acknowledgment by an employee (e.g., a designated employee, or accepting employee), the system no longer attempts to locate an employee to handle the customer transaction. The system and method continue to listen for additional customers requiring additional transactions at the one or more drive-up locations of the facility.

According to some embodiments, the system may be used to implement a method with devices for conducting transactions at a retail facility, where a transacting customer may pre-designate certain transaction information. This may be done through a suitable communication link, such as, through the Internet, or other preferably secure communications channel. The transacting user pre-designates the type of transaction using the user's computing device. The computing device preferably is registered so as to identify and associate the user and the device with the retail establishment, and, in particular, to one or more user accounts. Preferably, the device is a wireless mobile computing device that may be transported from place to place (e.g., such as, for example, a smartphone or tablet). The user initiates a transaction using the user's computing device. Preferably, at least one wireless user computing device is registered so that the user may use this device for transacting at a retail location of the retail establishment. The user initiates the transaction, which may be done at a location remote from the retail establishment's retail location. The user completes the transaction by visiting the retail location of the retail establishment. For example, the user, at a location other than a retail establishment location, such as the user's place of business, may initiate a transaction that is a deposit of the nightly cash receipts, and will be a deposit of a sum of cash. The user identifies the transaction details, including that the transaction is a deposit of the sum of cash (which in this example is the amount of the nightly cash receipts for the user's business, for example, five thousand dollars). The user also specifies that the deposit will be made at the retail establishment retail location X, which may be one of a plurality of retail locations of the retail establishment. The system is configured to expect the user at the retail location. In this example, a deposit slot with a door is provided at the retail facility to receive the user's cash deposit. A sensing mechanism is provided to sense the user when the user is within a desired predetermined location (e.g., a location at the retail facility where the transaction may be carried out). The sensing mechanism at the retail facility identifies the user device present at the facility, and, through communications with one or more other computing components of the retail establishment, identifies the consumer transaction that has been designated. The completion of the transaction may then be carried out.

A mechanism for controlling access to the deposit receiving bin is provided, and is associated with the one or more retail computing components. The user device identification and transaction information preferably are processed, and the mechanism, such as, for example, a solenoid, is actuated to release the slot door to provide access for the user to transact, which, for example, may involve making the deposit of cash. The mechanism also may close the slot door once the transaction is completed, or after some other event, such as after a period of time with no activity. In addition, one or more additional sensors or cameras may be provided to identify and confirm when a deposit has been made (for example, when the bin receives a cash deposit, envelope, slip or other item).

The system, method and devices also may be configured to survey transactions. The system, method and devices may provide triggers that actuate to identify a time of an event, which may, for example, be a transaction or component of a transaction. Some examples of event timing may include, the amount of time a customer is waiting before service is provided, e.g., initiation of service or completion of a transaction. Other time intervals may be evaluated in connection with the type of transaction and the length of the transaction time. The system, method and devices, provide the banking facility with a means for determining and evaluating the expediency of particular transactions, at particular times of the day, as well as with particular employees.

The system, method and device may be used to identify the types of transactions being made, and when they are being made. The system, method and devices preferably evaluate the time of day to determine whether patterns may exist for timing of particular types of transactions. This may be used to coordinate staffing needs, skill needs, or both.

The system, method and devices also may be operated in conjunction with transactions that take place within the retail banking facility. Employees may serve both the drive-up and in-building customers or clients.

According to preferred embodiments, the employees may be alerted through a suitable alerting device. Preferably the alerting device comprises a computing component that is configured with a communications hardware that may exchange information with one or more other components on a communications network. According to some preferred embodiment, the alerts, e.g., communications, are handled through computing devices, which preferably may be tablets, smart phones, PDA's or other portable device. The device, such as, for example, a smart phone, may be configured to communicate with a computing component, and preferably a computing component that is operating using software with instructions that instruct the computing component to receive information that a customer is present and requires service, and to generate an alert that is communicated to one or more employees through the device, e.g., smart phone. The phone preferably is configured to communicate on a network of the banking facility, which may be a separately configured Wi-Fi communication network. According to some embodiments, the network may be a private network of the facility, and communications may be secured, such as, for example, by encryption.

The system, method, and device may detect the presence of a customer that drives up into the drive-up service location. The sensor detects the customer vehicle, and sends an alert. The sensor detection of a customer vehicle activity in a drive-up lane may be configured to trigger a contact or relay. The sensor and/or relay preferably is connected to the computing component which is configured to detect sensor activity, and manage and generate alerts through communications with the devices, such as, the smart phones used by employees or other personnel. The sensors, according to some embodiments, are electronically coupled with the computing component, and may be hard wired with the computing component, or intermediate device. According to some other embodiments, the sensor may be configured as a wireless sensor, or to communicate via a wireless transmission (e.g., over a Wi-Fi network) to the computing component. The alert is communicated to one or more devices used by the employees, such as smart phones. The alert may generate a graphic image to appear on the phone screen display, may generate an audible alert, live video display, vibrational shaking, or combinations of one or more, or all of these. The alert may be a single audible alert, or may continue the alert until the employee accepts the customer transaction. In the case of video and/or audio between the customer and employee, that may continue even when the employee accepts the transaction. The alert may be sent to a plurality of smart phones that are issued by the retail establishment, such as a bank. Upon acceptance of the transaction by one of the employees receiving the alert, the alert may be automatically removed or canceled from appearing on the smart phones of the other employees (who also were alerted). The accepting employee, now handling the customer transaction is identified as an engaged status, and for a subsequent alert taking place while that employee is engaged in a customer transaction, that employee does not receive the alert.

BRIEF DESCRIPTION OF THE DRAWING FIGURES

FIG. 10 is a perspective view of a computing component configured as a kiosk.

FIG. 11 is a front elevation view of the kiosk of FIG. 10.
FIG. 12 is a rear elevation view of the kiosk of FIG. 10.
FIG. 13 is a rear elevation view taken of the encircled area 13 of FIG. 12, enlarged to show ports.

Figure 14:
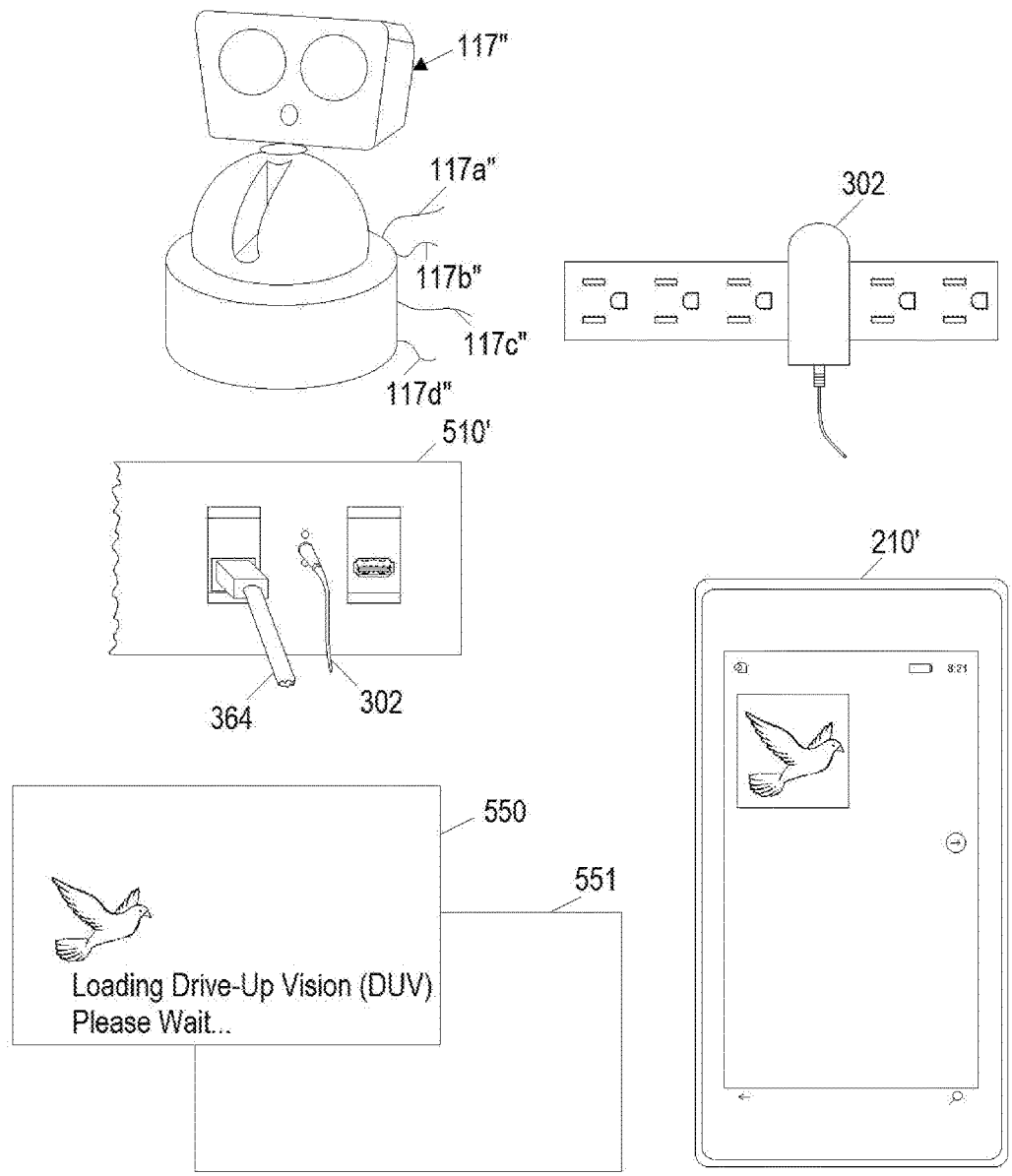

FIG. 14 is a schematic illustration of components for implementing a system for managing retail transactions according to embodiments of the invention.

Figure 15:
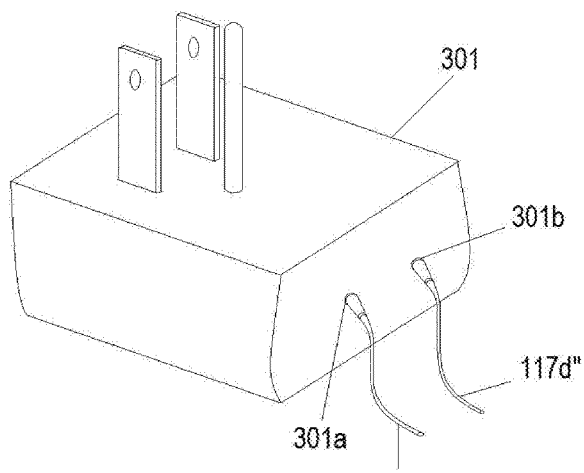

FIG. 15 is a perspective view of the power plug and adapter for powering a sensor.

Figure 16:
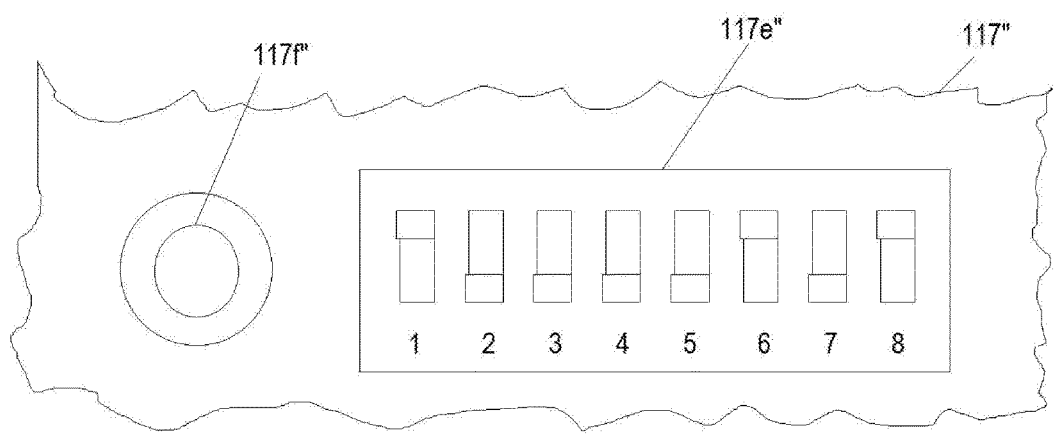

FIG. 16 is a partial view of the DIP switch panel and indicator of a sensor.

Figure 17:
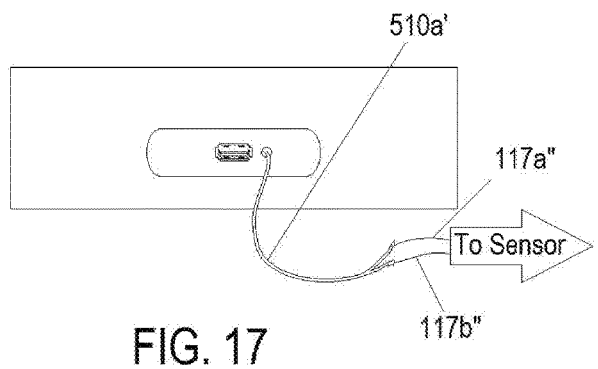

FIG. 17 is a rear elevation view showing a portion of the kiosk with terminal leads connecting to the sensor cables.

Figure 18:
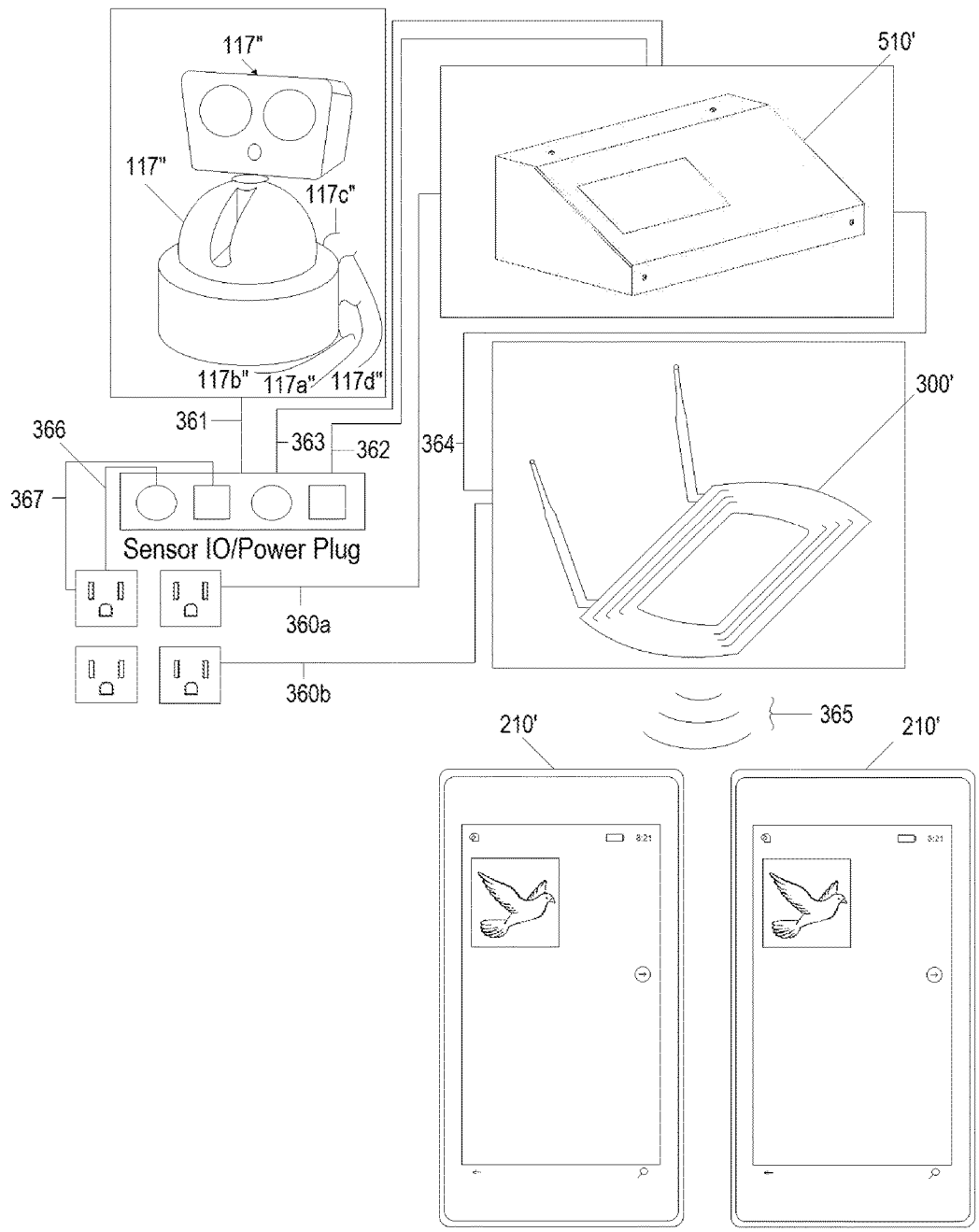

FIG. 18 is a schematic illustration of representative components of the system for managing retail transactions according to embodiments of the invention, illustrated with a wiring diagram to show the connections among the components.

Figure 19:
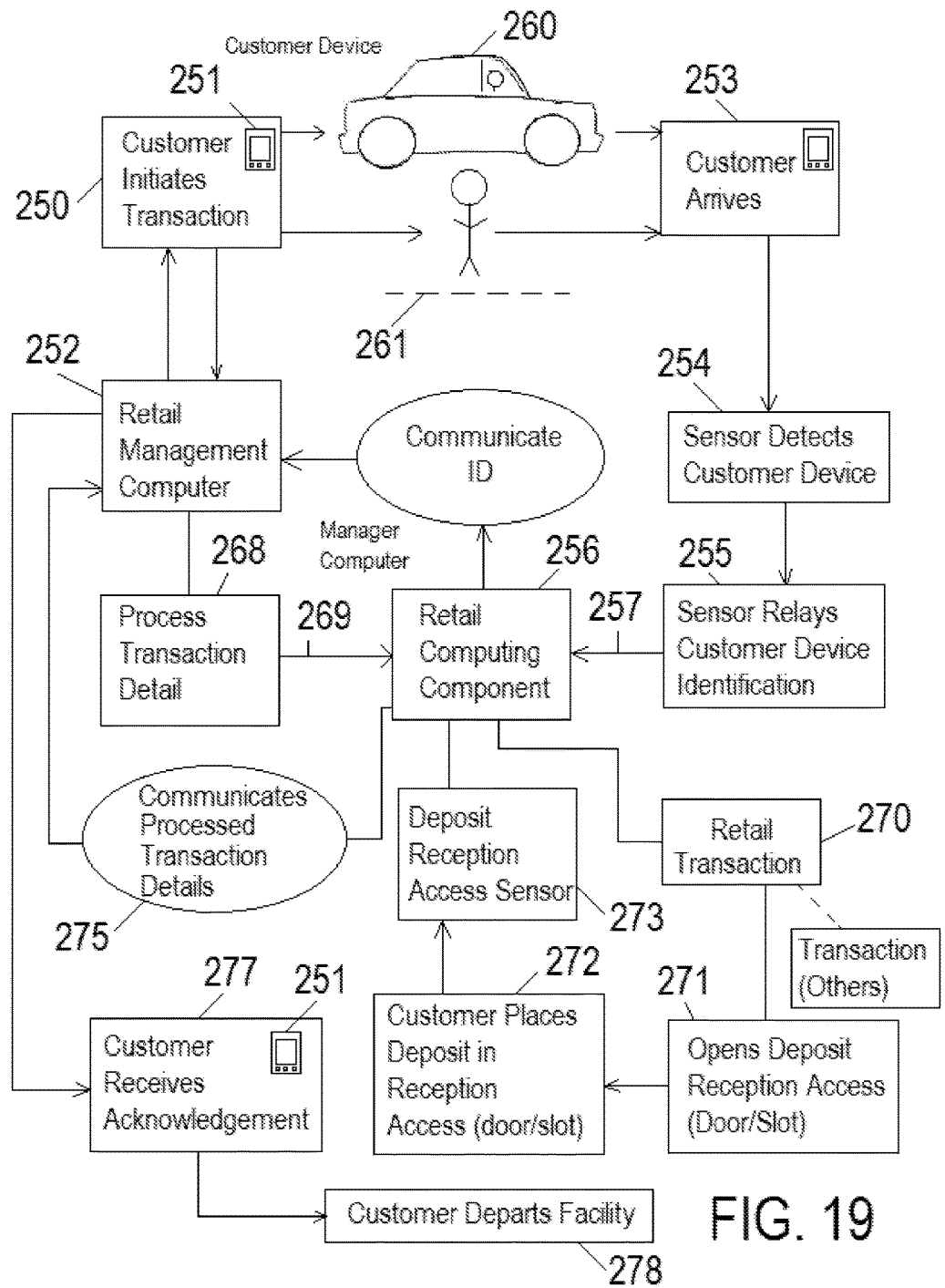

FIG. 19 is a schematic flow diagram depicting an exemplary embodiment of a system and method according to the invention, for an implementation where a customer device is used for a transaction that may be pre-designated prior to arrival at the facility.

DETAILED DESCRIPTION OF THE INVENTION

A system, method and devices are provided for notifying and facilitating retail banking transactions, which includes transacting business with customers and clients where the point of transaction occurs at a retail banking facility. The present system, method and devices preferably are implemented at retail facilities, and according to some embodiments at retail banking facilities, and preferably at retail facilities, such as banking facilities, that have a drive-up service. The system, method and devices are used to manage customer reception and customer transactions.

Figure 1:
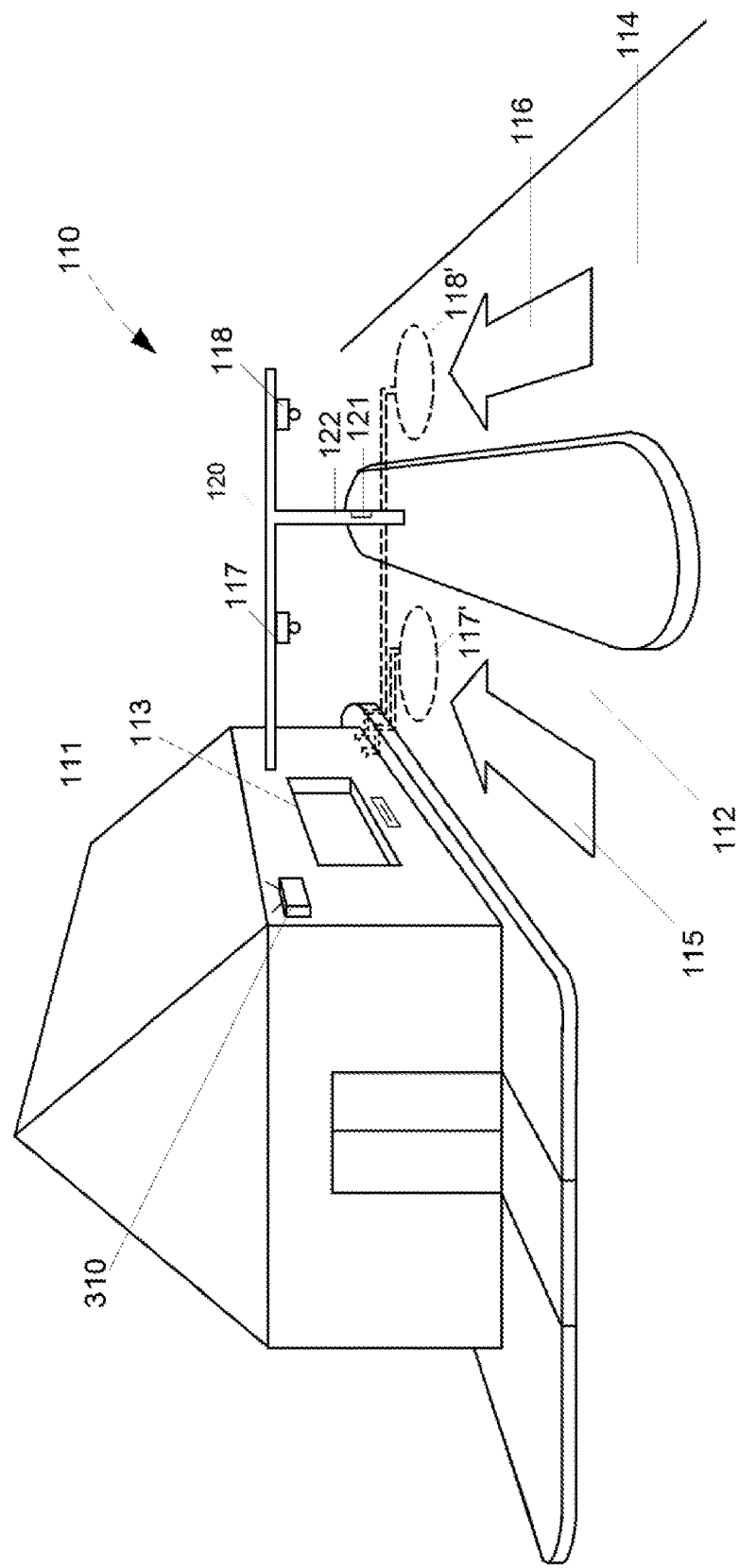
FIG. 1 is a schematic illustration showing a retail facility embodied as a retail banking facility implementing the system and method according to an exemplary embodiment of the invention.

Referring to FIG. 1, a schematic illustration of an exemplary depiction of the system is shown. The system 110 is illustrated in accordance with an embodiment where it is installed at a retail banking facility 111, which, in the exemplary depiction, includes a first drive-up lane 112 which passes adjacent to a window 113, and a second drive up lane 114 situated away from the window, in an adjacent lane. Arrows 115,116 identify the direction of vehicle traffic in the respective lanes 112,114. The arrows 115,116 may be painted on the roadway comprising the lanes 112,115, or alternately, may be omitted. Although illustrated in an arrangement with two lanes, the drive up lanes and configurations may be installed and constructed in accordance with local, state and federal laws, rules and other regulations that apply thereto. A first sensor 117 is shown situated to face the first lane 112, and a second sensor 118 is situated to face the adjacent lane 114. Sensors according to some preferred embodiments may be embedded in the pavement of each respective lane, 112,114, as illustrated by the sensors 117', 118'. According to some other embodiments, the sensors, such as those sensors 117,118 may be mounted on a mount, such as the structure 120. These sensors 117,118 preferably use a beam type of detection, radar, infrared, or other suitable detecting component. For example, according to some embodiments, sensors may be provided to communicate through a short-range wireless interconnection protocol (e.g., Bluetooth®) to interconnect with a computing device of a transacting user. The user computing device, preferably is a portable computing device that the user brings with the user to the retail facility to make transactions at the facility. The user device preferably is a communication enabled interconnectable device (e.g., such as, for example, a smartphone, connectable through Bluetooth® or other protocol), and which is recognizable by the retail establishment sensing and computing components, either through association with the user, or registration of a user device. The sensors may be shielded or range limited to detect users within the lane or within a discrete transacting area of a particular transacting location or portion of the lane (so as to prevent or minimize inadvertent detection beyond the desired area). According to some embodiments, the sensors 117,118 may comprise a camera or image sensing based device. Additionally and in other embodiments, a change in a designated camera's field of view, such as an area within one of the lanes 112,114 which is within the field of view of one of the sensors 117,118—when a vehicle enters the field of view, the software on the kiosk recognizes the (standard/typical) camera's field of view change and will alert and initiate the process similarly to the other notification devices. This preferably is done through the sensor communicating the detection of the field of view change to the computing component or kiosk. According to the embodiment illustrated, the structure 120 preferably may comprise or support a channel 122 through which communication of items may be exchanged between the customer and the facility. The structure 120 is configured with a channel 122, which preferably may be a pneumatic tubular channel, which has an opening 121 disposed at a level where a window of a driver's vehicle would be situated.

The sensors 117,118,117',118' preferably are powered with a power source, which may be wired or otherwise connected to the facility's power system or supply. According to some preferred embodiments, a sensor, such as the sensors 117',118' may be configured as a vehicle loop and/or loop detector (depicted in broken line representation in FIG. 1, which preferably are installed beneath the surface of the lane). The vehicle sensors 117,118,117',118' may be any suitable sensor that in capable of detecting the presence of a vehicle in the location. For example, according to some embodiments, a sensor may be configured as an in-ground loop detection unit, magnetometer, or the like, which preferably have adjustable capabilities for adjusting the sensitivity to ensure detection of a vehicle while eliminating false positives. For example, the sensors 117,118, 117',118' preferably may be wired to the computing component, or kiosk. Preferably, the computing component or kiosk is situated within the facility structure 111, as preferably also is the wireless component, or access point 300. In the event wireless detection sensors are utilized on or more access points may be provided within or outside of the structure 111. The sensors 117,118, 117',118' may be provided to comprise a sensor unit with electronic relays that actuate upon the detection of a vehicle, and where the sensor unit is electronically coupled to the computing component, such as, for example, a kiosk, which is configured with software containing instructions for managing the system, activity, and generating alerts. The signals preferably are communicated through a dry contact relay of the sensor or sensor unit, so that when there is a relay state change for a designated lane, there is a trip of the relay, and that trip is broadcast to the computing component. Alternatively, in the case of video motion detection, the software is configured with instructions to monitor video motion data and recognize when a change of state occurs, and, when it does, commence actions and tasks. According to preferred embodiments, the computing component is configured to listen, which may be to a channel, port or the like, for a signal, which may be the trip signal from the sensor relay. Alternatively, according to some other embodiments, the sensor may include a wireless transmission component that is configured to communicate signals.

According to some preferred embodiments, each sensor, such as those sensors 117,118,117',118' in the exemplary depiction, may be associated with a particular drive-up lane (e.g., 112,114), so that the sensor identification also identifies the corresponding lane at which activity is occurring. Preferred embodiments of the system preferably may be configured to designate particular sensors for a particular lane. According to one implementation, the lanes may be designated for handling different types of transactions (e.g., deposits only, check cashing) or different types of customers (e.g., individual versus business). The system also may be configured to assign different personnel based on the transaction type, which also may correspond with activity occurring at a particular lane. For example, using the exemplary embodiment depicted in FIG. 1 to illustrate, where there are 5 active employees or banking personnel who are using 5 active devices that have been assigned to them by the banking facility for their use at the facility. Lane 1 may be designated for new customers, and the system may be configured so that when a vehicle is detected at Lane 1 (e.g., the first lane 112), an alert that is generated is communicated only to 2 of 5 devices (that is only 2 of the 5 employees), where check cashing (regardless of the Lane (e.g., 112,114), or if designated to be in Lane 2 (e.g., the second lane 114), may go to all 5 of the available employees. The system preferably is configurable to regulate and control which personnel will get called to service a particular lane, based on predetermined designations assigned to an employee, as part of the employee profile. Preferably, the system may be managed through selections made to provide employee information, and tags associated with each employee data file. The system preferably includes a management feature that allows lanes to be identified and configured for transaction types, and which allows designations to be made for each employee. According to preferred embodiments, the management mode may be used by authorized users where selections are available from menus that may be used to designate one or more transaction or customer types for a lane (through the lane's associated sensor or sensor unit), and where menu selection options may be provided to select one or more employee capabilities (e.g., new customer handling, check cashing, etc.). In some instances, there may be default transactions that may be designated for all personnel (so all employees may be capable of one or more transactions). According to some embodiments, the employees are assigned a level, and levels are associated with permissible transactions, so that employees of a particular level may handle only those level transactions. The levels also may be hierarchical, where an employee designated a higher level may undertake all of the transactions that the lower level employees may perform, plus the additional transactions that only employees of that higher level (or a level higher than them) may perform. According to some embodiments, the system therefore may manage alerts to control who gets called to which lane based on the employee level (or other employee characteristics). The sensors 117, 117',118,118' according to preferred embodiments, are configured to communicate with a computing component that is assigned to generate alerts. The sensors 117,117',118,118' may be hard wired directly to the computing component, or through an intermediary relay or controller. Alternate embodiments of the sensor may communicate with the computing component through a wireless network, such as for example, using a Wi-Fi network or access point. The sensors 117,117',118,118' may be actuated to emit or change the signal when a vehicle is detected within the drive-up lane (such as a lane 112,114).

According to some embodiments, a sensor, such as, for example, the sensors 117',118', may be configured as a vehicle detection loop comprising an inductive-loop detector that includes an insulated, electrically conducting loop. The loop preferably is installed in the lane for adjacent placement where vehicles in the lane or service area will be detected. According to some preferred implementations, the loop may be installed in the surface, such as the pavement of the drive-up lane. The sensor also may be configured with a frequency generator provided to transmit energy into the wire loop at predetermined frequencies. The predetermined frequency may be any suitable frequency that provides suitable sensitivity for detection, and minimizes false positives. According to some embodiments, the frequencies may be between 10 kHz to 200 kHz, and preferably is adjustably configurable to provide suitable detection of vehicles and reduce or eliminate false positives. Adjustment may be made to account for the loop installation depth, construction properties of the loop and nearby structures, as well as the composition of the lane pavement. The inductive-loop system functions as a tuned electrical circuit in which the loop wire and lead-in cable are the inductive elements. The sensor therefore reacts to the presence of a vehicle passing over, or stopped within the loop. The presence of the vehicle decreases the inductance. The sensor, such as, for example, the loop, preferably includes or is electronically coupled with an output relay or solid-state component. The decrease in inductance actuates the electronic output relay or solid-state optically isolated output. The output preferably is communicated to the computing component directly or through an intermediate relay or controller, and preferably. The loop preferably may be adjusted to detect vehicles, and eliminate or minimize detection of false positives (e.g., children riding bicycles through the lane).

The detection of a vehicle by one of the sensors 117,117', 118,118' signals/notifies the computing component. The computing component may be configured as a separate unit, or kiosk, within the banking facility, and may be dedicated for use with the sensing and alerting system, and personnel management of drive-up transactions. The computing component, such as a kiosk, preferably is configured to connect to and communicate through a wireless component, such as, for example, a Wi-Fi wireless router or access point. The computing component is configured to receive and detect electronic signals from the sensor, process the detected events, and generate transmissions, which include communicating alerts to the devices used by personnel, such as, employees. The sensor detection of a vehicle commences the alerting sequence to generate alerts to one or more employees to indicate that there is a customer at a drive-up location (which location may be specified, e.g., first lane 112, or second lane 114, or both, based on the sensor reporting the alert). The employee is alerted by a graphic (appearing on the smartphone), an audible tone, vibration, live video feed, or combinations of these. The software is configured to allow the employee to respond to the alert. For example, the employee may respond by accepting the alert. An accept button may appear as a graphic on the display screen of the employee phone. The employee may press (e.g., touch) the area indicated on the display screen of the phone, and a signal corresponding to the employee acknowledgement (the press indicating acceptance of the alert) is issued. The employee acknowledgement signal preferably is communicated over the communication network, such as the Wi-Fi network, back to the computing component, which, according to some embodiments, may be configured as a kiosk unit, which may be a stand-alone unit. The computing component preferably receives the acknowledgement and, where other employees received the alert based on sensor sensing activity, the alert is canceled. The smart phones are then returned to the standby mode, and await other alerts, or, where the employee smart phone was handling another transaction, then that employee phone will be on busy mode.

According to some embodiments, in addition to the alerts mentioned, the system may be configured to provide a video feed or stream to the personnel device, such as a smartphone, allowing viewing of the customer or activity at the lane. The system also may be configured to allow for one way, or two-way audio communication between the banking personnel assisting the customer, and the customer in the drive-up lane. In addition, according to some embodiments, the customer also may be able to view video of the banking personnel, e.g., an employee that is handling the transaction. For example, a microphone, display screen, or both, may be provided at the lane location in proximity to the pneumatic tube slot or deal-drawer, where the customer would be expected to be when engaging in the drive-up transaction. According to preferred embodiments, the microphone, display or both, preferably are electronically coupled to communicate to the computing component, such as, for example, the kiosk unit, and provide the audio and/or video stream. The computing component may process the video and/or audio, and transmit it or relay the stream to a personnel device. The computing component may process the video, by compression or other manipulation, prior to sending it to the personnel device. According to some embodiments, the transmission of the video and/or audio may be actuated and become active prior to the acceptance of a transaction by the banking personnel, providing the video of the customer at the lane location to be visible on the device screen that the banking personnel is using. According to other embodiments, the transmission of the audio and/or video may be actuated when the banking personnel has accepted the transaction or acknowledged the alert. According to some embodiments, the actuation of the audio and/or video between the customer and banking employee, either one way (where only one or the other of the customer or employee is transmitted through video and/or audio to the other), or two ways (where both the customer and employee hear and/or see each other). The audio and video communications, according to some embodiments, preferably may be carried out using the employee device microphone, and employee device camera. However, in order to safeguard the video from the potential for including extraneous visual information (other nearby individuals, documents, or information within the camera field), the device may be configured to connect to one or more cameras which are provided at a fixed location to prevent the frame from potentially unintended viewing of other nearby images, such as, for example, other documents or happenings. In addition, a microphone also may be separately provided that may connect with the device used by the employee, such as the smartphone. The camera and microphone preferably are connected to the device used by the employee, such as a smartphone, through any suitable connection, such as, for example, a port on the device (e.g., wired), Bluetooth®, or other wireless capability. According to some other embodiments, one or more additional devices, such as, for example, a camera and/or microphone, mounted where the employee handles the transaction (e.g., such as at a terminal) may be provided, and configured to provide the video/audio to the computing component, for relay to the customer (via a display at the drive-up location).

The system preferably is configured with instructions to record and store times and the respective events. For example, the sensor detection of a vehicle in the drive up lane may be designated with a time, which may be an actual time 0930, or a relative time, time zero (a start time). The time at which an alert was generated for an employee, and/or received by an employee to request or designate that the employee assist the customer also is recorded and preferably is stored. The system, method and devices may track the time for handling the transaction, which may include the time from the customer arrival at the drive-up location to the time the customer completes the transaction or visit. In addition, the time from when the employee commences the transaction to the time when the transaction is completed also may be reported and recorded. The transaction may be categorized or assigned a transaction type. For example, deposit, withdrawal, cashing a check, submission of an application, e.g., for credit or a loan, and other types of transactions, may be designated via selection on the smartphone, and stored. A menu of possible transactions may be generated where the appropriate transaction(s) may be selected. For example, according to some embodiments, the system may be configured so that everyone may be notified, and as to an employee who is conducting the transaction with the customer, the employee may mark on the screen one of the transaction selection options, e.g., checking, false trip (no one there), balance inquiry (selection menu), and others. The system also may collect and store the transactional data, and provide the data for analytical use in conjunction with further analyses or reporting. The system may be configured to permit data mining on the type of transaction and other information collected to facilitate management of the facility and operation, at a single location, region or throughout the network of locations. According to preferred embodiments, the system preferably includes a management tool for configuring a survey by allowing the administrative or management users to design and prepare queries for a survey, as well as to provide selections that are available as responses for employees to select in response to a query or survey. The survey item may be configurable to designate selections for the survey. The time for each type of transaction may be evaluated, along with employee inputs (requested by a survey), and other information obtained through the transactional data. Management may utilize the information to facilitate the operations of the system. For example, where some transactions are likely to require excessive time, the transaction may be assigned to a particular lane, or to be handled by a particular employee, or type or level of employee.

For example, survey data may be obtained by having an employee respond to a survey. For example, a survey for an employee may elicit and obtain information, such as, for example, what type of transaction was requested and/or provided, at what terminal and/or lane was the transaction carried out, whether the transaction was a false trip, and whether the employee completed and/or was able to complete the transaction. The survey may be used to collect and store the information, and analysis of the information may be undertaken to determine whether any patterns of usage, transactional details or services identify an issue that can be improved or addressed. The survey information also may identify areas of strength, as well as factors contributing to high rates of successful transactions or completions.

The system may include a survey engine, which preferably is configured to generate indicia on the screen display 211 of a device, such as, a smartphone 210 that is used by an employee. The indicia may provide queries and request that the employee make an input of one or more selections responding to or answering the query. According to some embodiments, the employee may be presented with an opportunity to input text (e.g., in response to a query), or may input both, a selection and text. The transactional data may be obtained for each transaction and for each employee. A database of activity and employee actions may be maintained for transactional activity, as well as customer encounters. The system may be configured to implement the survey engine at the computing component or kiosk, and may store the information locally, at the computing component, or to another device that may be local or remote therefrom. For example, according to some embodiments, where the retail facility conducts operations at a number of branch or facility locations, a central repository may be maintained to receive, store and process data for individual branch location facilities, as well as other metrics, such as, for example, regions, collective stores, or other measured collective, branch or personnel activity data. Information may be obtained from the transaction that includes data pertaining to transaction handling by the personnel of the establishment, as well as timing of transactions and types of transactions handled. The information may be further coordinated, arranged and assembled into reports. For example, coordination of activities with holidays, days of the week, time of day, and transaction types may be obtained and evaluated for use in managing staffing, managing lane activities or other application in the retail establishment.

Figure 2:
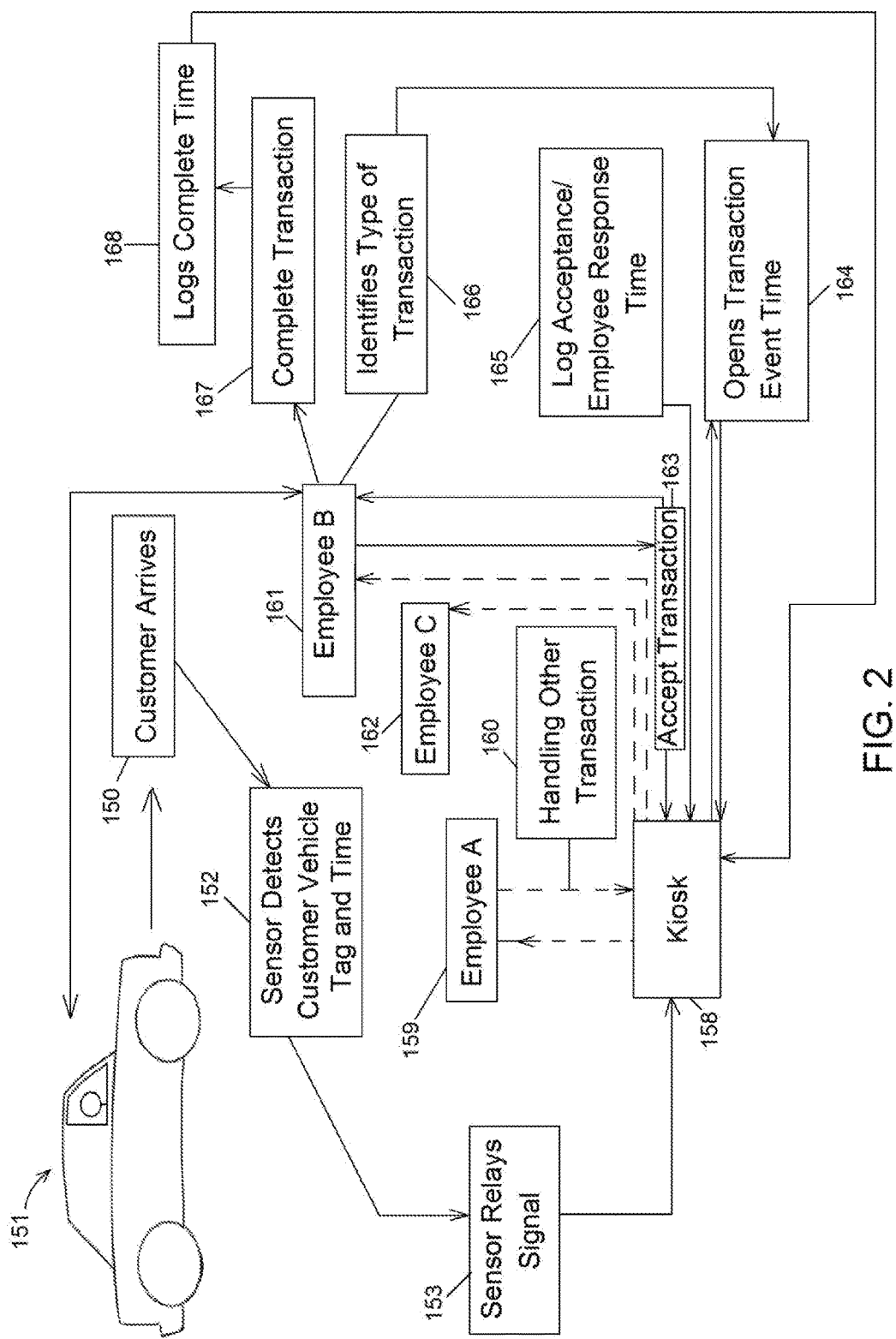
FIG. 2 is a schematic flow diagram depicting an exemplary embodiment of an implementation of the system and method according to the invention.

Referring to FIG. 2, a flow diagram illustrating a preferred example of the method for managing transactions at the retail banking facility having a drive-up operation is depicted. The exemplary system and method may be carried out to manage transactions at a banking facility, and more particularly, at a drive-up banking facility. A customer arrives, block 150, at the facility in a vehicle 151. The customer vehicle is detected, block 152, and an event is created and tagged with a time. The sensor relays the information to the computing component or kiosk, block 153. The system, and preferably the computing component or kiosk, block 158, is configured to listen for a detection signal, and upon confirming the detection of the signal, block 155, actuates a trigger, and commences processing based on the trigger. The processing takes place and preferably includes broadcasting an alert to employees on the system, which in the depiction in FIG. 2, includes employees A, B and C. Other employees, whose computing devices, such as smartphones, are not active (or not logged in to the network), may be treated as not available. The processing continues by routing the task, block 158. The routing of the task preferably includes issuing an alert which is communicated to available individuals (e.g., employees designated or capable of handling the transaction, customer service window) whose smartphones are active on the system, which here are Employee A, Employee B, and Employee C. The routing of the task, block 158, may issues an alert to all employees active, such as Employees, A, B, and C. In this example, the routing of the task, as well as the alert, may not be issued to Employee A, block 159, since Employee A is identified as already engaged in the handling of another transaction, block 160. According to some embodiments, the alert may be issued to all employees and those who are already engaged in a customer transaction may not see the alert. Alternatively, the alert may be shown, since it is conceivable, that all employees available may be engaged in handling transactions, and the alert may remain on the employee's device, until the next available employee is able to respond to the alert. In this depiction, Employee B, block 161, and Employee C, block 162, each receive an alert. Employee B accepts the alert, block 163, and a log of the acceptance is created to mark the employee response time, block 165, and which also may commence the employee transaction time. Employee response times may be determined from the customer arrival detection time, to the employee acceptance time, and/or from the time of the alert issuance to the time of acceptance. The acceptance is acknowledged, block 158, and an opening of a transaction and event and an associated time is recorded, block 164. Employee B carries out the transaction, and may identify the type of transaction, block 166, which may be done by Employee B identifying an input on the screen display of the device, such as the smartphone. The open transaction event, block 164, receives the transaction type, which provides further information about the customer transaction. Employee B completes the transaction, block 167, and a completion time is logged, block 168, and the open transaction event, block 164, receives the completion time. The completion of the transaction returns Employee B to an available status. The system has the information that identifies the customer transaction, which measures the efficiency or lack thereof with which the transaction was handled, and the timing of the reception, complete transaction, as well as components of the transaction. The management system may use the transaction information to manage and regulate availability, types, and staffing needs. The timing of the transactions preferably also maintains actual times, and days, providing further information to identify the occurrences of particular transaction types, and volumes at certain days or times. The information may be used to generate reports that may manipulate the data to provide coordinated staffing recommendations or determinations of the facility's needs.

Referring to FIGS. 3-9, exemplary embodiments of a device for utilization by banking personnel, which is configured as a smart phone utilized in connection with the system are illustrated in connection with carrying out an implementation of the method. Some examples of the device that may be used by personnel of the facility may include a tablet, PDA, or smartphone. The device, such as the smartphone 210, preferably is issued to the employees of the facility for their use during their shifts. The devices preferably remain at the facility, and may be charged there between uses. The smartphone 210 is a preferred example of a device, and may be issued to or assigned for use by an employee. Preferably, a plurality of smartphones is provided, and each employee may use one of them during the employee's shift, and preferably, return the phone when the shift is completed. According to some embodiments, an employee may be issued (or may select) any one of the available smartphones for use during a shift. According to some other embodiments, the employee may be issued or designated a particular smartphone to use during the employee's shifts. Different employees may use the plurality of smartphones, or a particular phone may be assigned for use by a single employee.

The smartphone 210 is shown having a screen display 211, a housing 212, a charging port 213 (which may be a USB or other suitable type of port), a speaker 214, volume buttons 215,216, and a power button 217. The smart phone 210 preferably also may have a microphone 217, and a second speaker 219. A home button 220, a back button 221 and find button 222 also are illustrated, and may be buttons displayed graphically on the screen display 211 or may be physical buttons, or may be combinations thereof, or both. The screen display 211 is illustrated with the application icon 230 appearing thereon. A status bar 231 also is shown depicted to appear on the display 211. The smartphone 210 preferably is configured by connecting the phone communication system to communicate through the Wi-Fi network on which the system operates. For example, the smartphone 211 preferably connects to the wireless access point (e.g., 310 shown in broken lines FIG. 1, which preferably is situated within the building) and is configured to connect to a designated IP address. The application preferably may be configured by a user going through the application set up screens and entering the information requested. Referring to FIG. 4, the menu bar 400 shows an icon including a gear icon 410, Wi-Fi icon 411, and information icon 412 are illustrated. In this example, when the user selects the gear icon 410 (the setup icon), the user is presented with the screen shot 413 that includes an IP address field 414 into which the user inputs the IP address of the server, and a user name field 415, into which the user enters the user name (employee's name). The user name field 415 may be configured only to accept registered employees by their respective identifiable registered name. The settings preferably may be saved to the phone, so that the user is only required to enter the set up information a single time.

Figure 3:
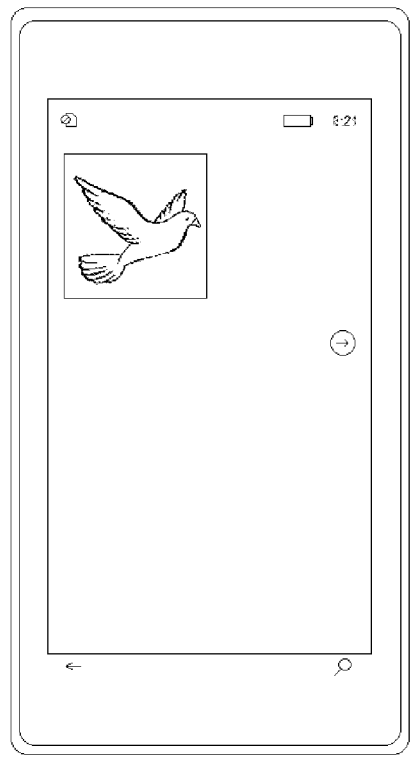
FIG. 3 is a front elevation view of an example of a smartphone showing a screen display with a screen shot having the system icon appearing thereon.
Figure 4A:
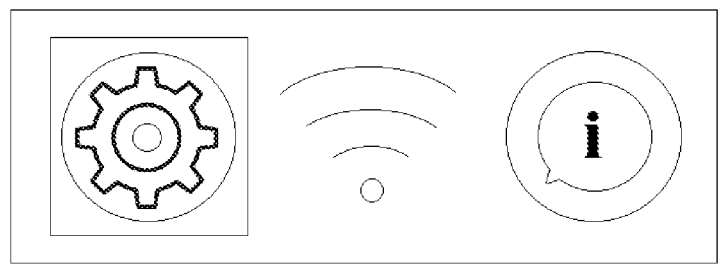
FIGS. 4A and 4B are partial screen shots of a status depiction appearing on the smartphone screen display.
Figure 4B:
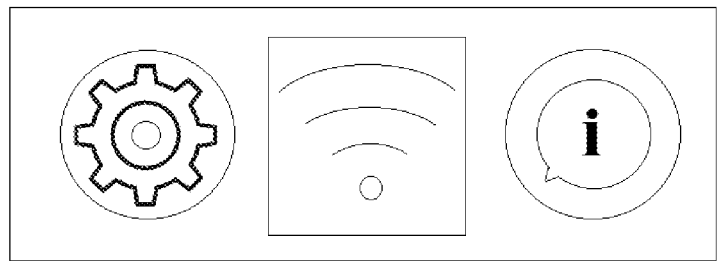
Figure 5:
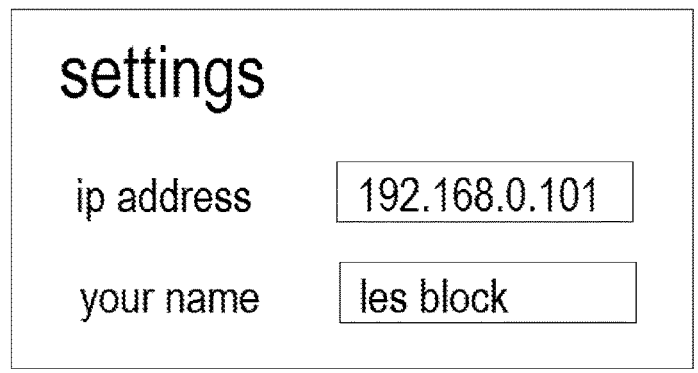
FIG. 5 is an exemplary screen shot showing the IP and user settings windows.
Figure 6:
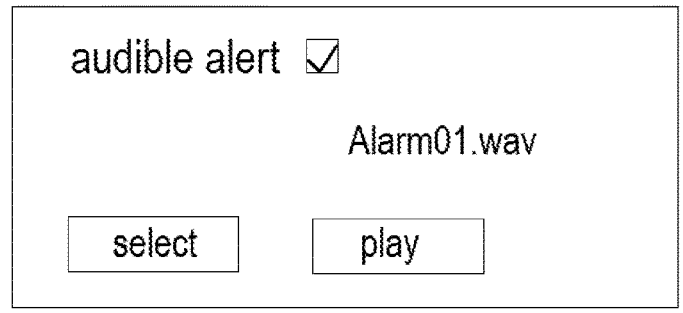
FIG. 6 is an exemplary screen shot showing an alert configuring window.
Figures 7A, 7B:
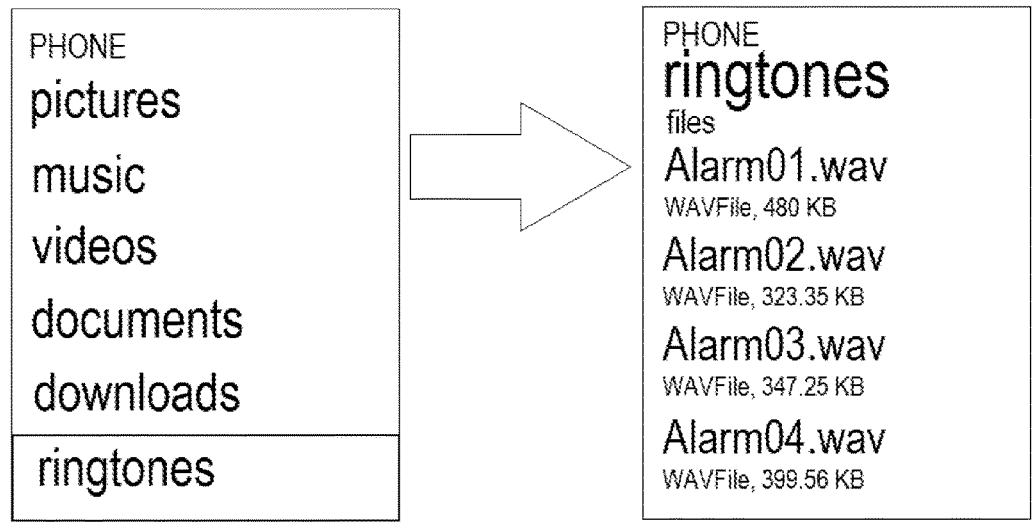
FIGS. 7A and 7B are screen shots depicting the ringtone selection option, and ringtones for selection, respectively.
Figure 8A:
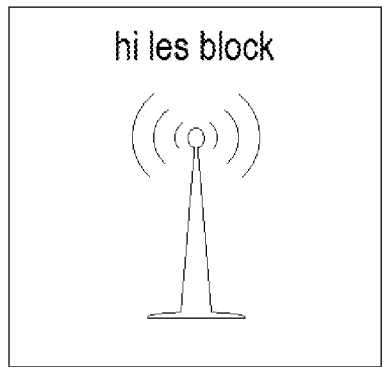
FIGS. 8A and 8B are screen shots depicting the connectivity icons.
Figure 8B:
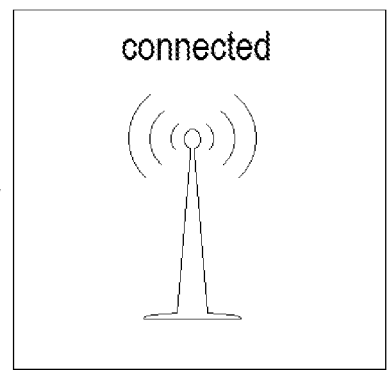

The system preferably may be configured to provide options for how the user is to receive alerts. For example, the user may receive a visual alert on the screen, an audible alert (e.g., a tone), one way, or two way video, audio, vibration or combinations of one or more of these. FIG. 6 shows an exemplary screen shot 420 that provides an option to select an audible alert by marking a selection box 421 on the screen 420. A user may make selections of an audio file to play, such as the exemplary Alarm01.wav file depicted on the screen 420. The user may mark the selection box 421 and save the selection by clicking or touching on the select button 422 on the screen 420. Optionally, the user may elect to play the file selected by clicking or touching the play button 423. Another option is user selection of an assigned ring tone for determining the sound the user desires to play when a sensor 117,118 (FIG. 1) detects activity at a respective drive-up lane 112,114 (FIG. 1). An exemplary phone menu screen 430 is depicted in FIG. 7A, which includes an option for selecting a ringtone 431. FIG. 7B illustrates an exemplary screen shot 433 providing a selection of a plurality of ringtones 434 that may be selected. The user may be able to select sound clips that are on the phone for use as a ringtone. When the ringtone is selected, the application menu as shown in FIG. 4 is generated to appear on the screen display 211 (FIG. 3). The user initiates the connectivity by selecting an icon, which, in the exemplary depiction in FIG. 4B, is the selection of the Wi-Fi icon 440, indicated by the selection box 411a surrounding the Wi-Fi icon 411. As shown in FIG. 8A, indicia 441 appears on the screen display 211, and according to a preferred embodiment, identifies the user by the user's name (e.g., a greeting) 442. The Wi-Fi symbol or icon 443a is shown in FIG. 8A, and in FIG. 8B the Wi-Fi icon 443b is shown with the indicia connected 444.

Figure 9:
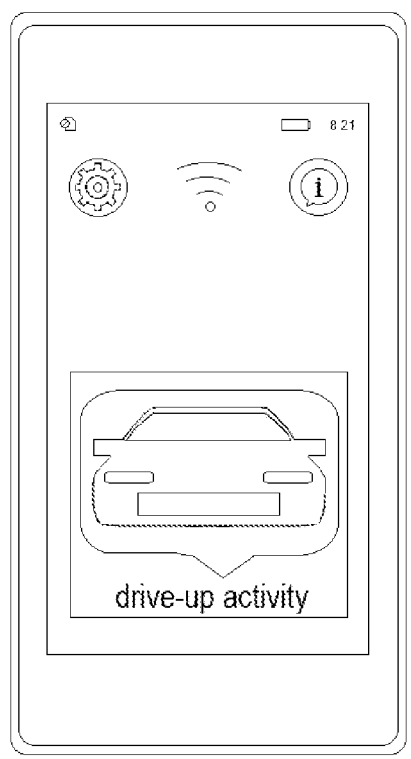
FIG. 9 is a front elevation view of an example of the smartphone of FIG. 3 showing a screen display with a screen shot illustrating indicia of activity taking place.

FIG. 9 illustrates an exemplary screen shot 450 showing an exemplary graphic 451 (shown comprising a vehicle 451a and text 451b) generated and displayed on the phone 210 (FIG. 3) screen display 211 as a result of drive-up activity being detected by one of the sensors 117,118 (FIG. 1). In addition to the visual depiction on the screen shot 450, the system preferably is configured to vibrate when the activity is detected (as part of the alerting mechanism), display video or audio from the drive-up location, sound a ringtone, or combinations of these. According to preferred embodiments, where the audible alerts setting is enabled (see FIG. 6), the phone 210 also will emit an audible ringtone repeatedly until the activity is acknowledged.

The system preferably is configured to manage a plurality of remote devices, such as smart phones, being used. For example, where an alert is issued, all smart phones that are active on the system (e.g., have the application enabled and running), may receive the alert. Once a user of one of the phones has responded by acknowledging an alert, the alert may be dismissed, and the other connected smart phones will cease generating alerts and return to their standby status (see FIGS. 4A and 4B). The system, method and devices preferably are configured to receive and respond to user acknowledgements. For example, where a user receives an alert, and makes an acknowledgement of the alert (by touching the screen, e.g., for a set period or in a designated location of the screen) the selection is communicated to the management computing component (which may be configured as a kiosk) through the network. The system preferably includes a management computing component (e.g., kiosk) configured with software containing instructions to receive signals from the sensors 117,118 (FIG. 1), through a hard-wired relay from the sensor (or sensor unit) and, based on the detection of activity detected by the sensors 117,118, and the corresponding signals, generate an alert that is communicated to the remote devices, such as the smart phone 210 (FIG. 3) which are active and connected to the system. According to some alternate embodiments, the computing component may receive signals from sensors and may be configured to communicate through a network relay, such as, for example, the Wi-Fi access point 310 (FIG. 1), The computing component preferably includes computing component, such as, for example, a processor, storage media for storing information and/or instructions, a power source or connection, a display screen and circuitry to electronically couple the components. According to a preferred embodiment, the computing component may be configured as a computing unit with a display. Referring to FIGS. 10-13, a computing component or kiosk is shown, configured having a housing for housing components, which preferably include one or more processing components, such as, a processor, microprocessor, controller, microcontroller, electronically connected with a storage component, such as, storage media, hard drive or chip containing instructions for operating the system, designating employees and capabilities, designing surveys, and receiving, storing and managing transaction activity in conjunction with a drive-up window. The computing component or kiosk 510 has a housing 511 and screen display 512. Referring to FIGS. 12 and 13, connectivity ports for connecting with a sensor, wireless access point, network, power supply, or other connection to be made, are provided. For example, the power supply may connect through a micro USB port 517. A network port 516 is shown, and may comprise a network jack. A USB port 515 is provided and preferably may be used to connect one or more other devices, such as, for example, data input devices, video, audio, input devices, such as a keyboard, and the like. Mounting means, such as, for example, mounting holes 520,521 are shown provided on the housing 511. An opening or slot 523 is shown provided in the housing 511, and may be used for passage of wires to make connections within the unit 510 to components therein. The computing component 510 preferably is configured to generate alerts and transmit alerts to computing devices, such as smart phones, tablet and the like, being used by personnel at the facility to handle customer transactions at the drive-up areas. As discussed herein, the computing component preferably is configured with, or to connect with a wireless communication component, which, for example, may be a wireless router or access point, such as the wireless component 300 (FIG. 1). The unit 510 may make a wired connection through a network (e.g., using the USB port 515 or network jack 516), or alternatively, may be configured to communicate a wireless signal, through a wireless component of the unit 510 (which may be internally configured with the unit circuitry or connected to one of the unit ports, such as, for example, the USB port 516).

Referring to FIGS. 14-18, a preferred implementation for installation of a system configured for installation at a retail facility is provided. In the exemplary depiction, examples of system components are shown, and include a computing component or kiosk 510', a sensor 117" with detection signal cables 117a", 117b" and power wires 117c", 117d", a wireless router or access point 300', remote computing devices, shown comprising smartphones 210',210", a wall adapter 301 (for providing power to the sensor via the power wires 117c", 117d"), and a power adapter 302 for powering the kiosk 510'. In addition, in the exemplary installation depicted, a web browser is generated on a display of a computer to receive inputs, and also may be used to connect to and configure the router 300'. The sensor power wires 117c", 117d" connect to the terminals 301a, 301b of the wall power adapter 301. The installation also preferably includes setting up the sensor 117", which in this example involves making settings of DIP switches 117e" of the sensor (for settings, which preferably include, presence, frequency, sensitivity, indicator, and on delay). The sensor 117" also is shown with a detection indicator comprising an LED 117f", which lights or changes color when activity is detected. In FIG. 17, a connection between the sensor detection signal cables 117a", 117b" and kiosk circuitry (via the leads 510a') is illustrated. According to preferred embodiments, the kiosk 510' may include circuitry, and one or more circuit boards (within the kiosk 510'), configured with a terminal, or wire leads (such as those wire leads 510a' illustrated in FIG. 17), for making a connection with the sensor detection signal cables 117a", 117b", which communicate detection signals from the sensor 117". In addition, the exemplary installation depiction further shows examples of powering the kiosk 510', and connecting the kiosk 510' to the router 300' to support wireless communications between the kiosk 510' and smartphones 210', 210" (FIG. 18). A power adapter 302 is shown connected to power the kiosk 510'. Screen shots 550, 551 also are illustrated to depict the initialization of the components and the kiosk 510' implementing software that includes instructions for processing signals of the electronically coupled components (which may be electronically coupled by wired or wireless connections). In the exemplary installation depiction in FIG. 18, an access point 300' is shown with respective screen shots 210a', 210a" of remote computing devices, which in this example, are smartphones 210', 210". The smartphones 210', 210" make connections to the router 300'. In addition, an example of a preferred wiring diagram is shown, illustrating examples of a sensor 117", computing component, which is the kiosk 510', access point 300', and smartphones 210', 210", and preferred communications among these devices, showing a preferred arrangement of the electronic coupling thereof. A wiring diagram key also is provided in Table 1 below to illustrate the representative connections depicted.

TABLE 1

| Wiring Diagram Key | |
|---|---|
| Kiosk Power Cable | 360a |
| Router Power Cable | 360b |
| Drive-Up Sensor Cable | 361 |
| Drive-Up Signal Terminal | 362 |
| Drive-Up Signal Terminal | 363 |
| Ethernet | 364 |
| Wireless Signal | 365 |

TABLE 1-continued

Wiring Diagram Key

| | |
|---|---|
| 12 V + Voltage | 366 |
| Ground Wire | 367 |

The system is illustrated in conjunction with a smartphone, and may be configured to operate on most remote computing devices, such as, for example, smartphones, tablets, PDA's and the like. Preferred embodiments of the system may be implemented by providing software with instructions for carrying out operations of the smart phone, such as, for example, displaying indicia on the screen, generating and sounding audible alerts, vibrations, ringtones, and other coordinated alerts (e.g., alerts through one or more Wi-Fi or Bluetooth connected devices). The computing device used to receive alerts, such as, the smartphone 210 illustrated in the exemplary depictions, may be configured by a user to connect to a network through an access point, such as the access point 330 (FIG. 1). The access point may be used to handle communications through the system, and may be secured with encryption, and/or passwords. The user computing device, such as the smartphone, may connect to the access point by identifying the name of the device and entering the appropriate password. The user computing devices may make connections and operate to receive alerts and communicate through the system, even where there is no Internet connection available.

According to one embodiment, one or more wireless sensors are provided and are positioned to detect activity in one or more drive-up lanes of a drive-up retail facility. The sensors provide information to identify a retail customer desiring to make a transaction. According to a preferred implementation, a sensor is provided for each lane, and is positioned to detect a customer in the lane. Preferably, the sensor is configured to detect a customer present at the transacting area of the lane. A transacting area of the lane, for example, may comprise the location of the lane where a drawer, tube, keypad, or other interactive feature is available.

According to a preferred embodiment, the drive-up lane sensor comprises a wireless sensor that is configured to connect with one or more components of the system through a network (e.g., via a wireless access point or computer). In accordance with an exemplary embodiment, the sensor, such as the one represented by block 153 in FIG. 2, is configured to communicate information to the computing component, such as the kiosk (see e.g., block 158 in FIG. 2).

The system is configured to be accessed by a customer that desires to make a transaction at the retail establishment. In an implementation where a retail transaction is desired at a retail drive-up facility, the transacting user, e.g., the retail customer, may pre-designate the transaction using a mobile device. The mobile device may be the customer's own personal mobile device. The mobile device preferably is configured with software that includes instructions that provide the capability for the user to make a selection of a one or more transaction types, and, for some transaction types, to provide additional information about the transaction, for example, the retail location at which a deposit will be made. The transaction type selected may be "deposit" and the transaction may include an amount such as $240.00, which may be input on a display of the user's device. The user device may be linked to communicate through a connection with the retail establishment, which may comprise connecting to one or more servers of a retail establishment (which may be hosted or maintained by the retail establishment or operated by another provider for or on behalf of the retail establishment). The transaction may be conducted using downloadable software that the user downloads and operates on the user smart device. Alternatively, or in addition thereto, the software may be provided for access as a service, where the user device accesses software remotely, over a communications linkage (e.g., the Internet). The downloadable software application may provide the user with the capability to select transactions and provide information about a transaction from the user's smart device, and may communicate the transaction details (including, for example, the transaction type and transaction information), to a computing component, such as a server, that is being used to carry out the retail establishment transactions. The retail computing component may be a centralized component, such as a server, and the server may server one or more locations of the retail establishment operating facilities, e.g., one located in Town A, one in Town B, ones located in State C, or any other arrangement. A retail management component, such as a centralized retail server, may communicate with one or more retail computers at the retail locations.

According to a preferred implementation, the smart device of the consumer includes software that contains instructions for communicating with the equipment at the drive-up facility. For example, the sensor may be configured to detect that a customer is present in the sensor detection area. The sensor preferably is configured to determine the need for a particular transaction by interrogating or receiving a communication from the customer device. According to one embodiment, the sensor receives a unique identifier from the customer device that identifies the customer, the customer device or both. The sensor is configured to allow the detected unique identifier information (the identification information) to be accessed or transmitted to one or more computing components that have stored on them, or which are able to access, the customer profile. At a minimum, the customer profile preferably includes the transaction information for that customer. For example, the customer that provided information for a transaction type of a deposit in the amount of $240.00, who is now at the drive-up transaction area (such as a window), is identified, and the transaction may be completed by the customer providing the deposit through the window (or other input mechanism) at the drive-up lane. According to some preferred embodiments, the customer device may be configured to wirelessly communicate information to a sensor of the retail location (e.g., a sensor provided to detect activity at a drive-up lane), which may be carried out using a short-range wireless interconnection, such as a Bluetooth® standard. The retail location sensor may be a Bluetooth® sensor that can communicate with or receive a communication from the customer device and communicate that information through a network to one or more of the retail establishment computers, such as a transactional server or other computing component, including a remotely situated computing component, which is remote of the retail location.

The sensors preferably are positioned to provide detection of a proximity region where the consumer is anticipated to be located when using the drive-up facility transacting mechanism (e.g., in the drive-up lane location where a drawer, tube, window, or other equipment for customer use may be provided). A sensor preferably is provided having an emitting region that is confined to an area of the drive-up location (e.g., along the lane) where a customer is expected to be present with the customer's device. The sensor transmissions preferably are limited in reach or direction, or are otherwise shielded or attenuated, to prevent inadvertent detection of consumer devices in other lanes, or locations other than the transacting location of a respective lane. For example, where a consumer places the consumer device on a passenger seat of the consumer's vehicle, the sensor of an adjacent lane preferably is shielded so that the consumer device on the passenger seat of the vehicle will not be detected by the adjacent lane sensor and therefore not determined to be in a lane other than where the vehicle is located. The configuration of the system and method reduces false indications, or false positives for lane activity. Alternatively, lane transacting locations may be staggered or offset so as to eliminate or minimize the potential for false activity detection within a lane.

The sensors preferably are discrete and therefore may detect activity and record the identities of users based on the transacting user's use of the user's device. In this manner, the transaction may be monitored, and transaction information, including transaction types, time of transaction, and other metrics that are desired to be measured, may be collected and recorded for users of the transacting system. If desired, the transacting information may be collected and/or stored separately from the specific customer transaction, or otherwise managed to comport with applicable privacy regulations or laws.

The sensors also may be provided both, to detect activity sensed within the vicinity of the detector, and to identify the customer based on the use of the customer device and a unique identification provided by the customer device. The customer device application software may be used to generate the information that is communicated to the sensors. According to some embodiments, the information comprises an identification that uniquely identifies the customer and/or customer device. The customer device application software may be configured to provide the identification upon being in range of the drive-up lane sensor, or upon receipt of a request from the sensor when the customer device is within the sensor range.

The employee handling the transaction for the customer may receive an indication of the transaction where the employee logs information for customer transactions. Alternatively, the employee may receive an alert on the employee smart device which may identify the transaction (such as, for example, the smart devices 210, 210', 210"). Therefore, the system may be configured to have the customer transaction provided to one or the other or both of the employee computing device (e.g., 210, 210', 210") and the retail transacting device where transactions are made. According to some alternate embodiments, the employee devices may be configured to receive and communicate alerts, as well as process transactions.

According to another embodiment, a location that the customer may visit at the retail facility includes a deposit slot. The deposit slot may be a tray, drawer or door that includes a passageway suitable for receiving cash. In most instances, the cash is received in the form of envelopes, such that when the slot opening is closed, the deposit falls into a collection box or container. According to a preferred embodiment, the deposit slot door is electronically actuated, and may be set to open upon the triggering of a sensor. The sensor may be situated proximate to the deposit box opening, and is configured as discussed in connection with the drive-up lane, to sense a customer device with which the sensor and customer device wirelessly communicate (e.g., interconnect). The communication may involve the sensor detecting the identification of the customer device and/or customer using the device. A customer, preferably, prior to arrival at the retail location, prepares the transaction information by preparing the transaction details, for example, the transaction type, transaction amount, and retail location at which the transaction will be carried out. The customer preferably operates a computing device, such as a smartphone or computer, and enters the transaction details so they are communicated to the computing system of one or more of the retail computing components. The customer preferably also has an application on the customer smartphone, which provides an identification of the customer and/or device and enables the identification to be communicated when the customer arrives within the sensor field, which in this example is at the deposit slot. According to a preferred embodiment, the deposit slot door is configured to preclude access to the passageway (deposit bin) until and unless the sensor has confirmed detection of a customer device that matches an anticipated transaction. According to some embodiments, the deposit slot may be separately provided and configured for transactions where a user device is required to actuate the slot door. The sensor preferably is linked through a wired or wireless communication linkage, which may be a network, to exchange information with a computing component, which may be a server or other component on site or remote from the retail facility. The sensor and computing component exchange information to verify the customer transaction and provide a signal to operate an actuator, such as a solenoid, to open the slot door in order for the customer to insert a deposit. The solenoid also closes the slot door, or alternatively, or in addition, the slot may be closed by the customer after depositing the transaction materials (e.g., cash, deposit slip, envelope, or other material). Once the slot door is closed, the solenoid takes over, and again the door remains closed until an authorized transaction is confirmed for a customer (such as the next customer user, or a different transaction by the same customer). According to some embodiments, the number of transactions for a customer may be limited, and a customer's ability to make consecutive deposits or multiple deposits for different companies may be limited or managed to provide handling of the transactions at the same retail location. The transaction is recorded for the customer, and the activity is confirmed to match the sensor detected customer or customer device with the customer's transaction.

According to some embodiments, the system may be configured to implement audio communications, and preferably, two-way audio from a customer device, such as, for example, a customer cell phone, to an employee smart device. The retail facility, as part of the retail consumer or customer application, or separately, as part of a separate application, may provide an application that the customer may utilize or install on the customer smart device. The application preferably is configured to recognize the retail facility computing component when the customer device (or other device registered by the customer) using the software application is within the sensor or communication range of the retail facility computing or signal generating components. The consumer smart device preferably includes a microphone (integrated or separate) and a speaker, which the customer may use to communicate with the retail personnel. The customer application preferably is linked to exchange communication signals with the employee smart device directly or through a retail establishment computing component. For example, according to some embodiments, the employee smart device may utilize an application that provides local communications between the employee smart device and a customer device. Alternatively, the employee smart device may provide communications through one or more retail establishment computing components that also connect with the consumer smart device to manage communications between an employee and a transacting or inquiring customer.

Referring to FIG. 19, a flow diagram illustrating a preferred example of the method for managing transactions at the retail banking facility is depicted. The exemplary system represented in FIG. 19 is an example where a transacting user is a customer, and where the customer may pre-designate the transaction prior to arrival at the retail facility. The system may be configured to provide a capability for the customer to communicate (via the customer device) with a retail management computer which may, for example, be a server remotely situated from the retail facility where the transaction will be carried out. In the example illustrated in FIG. 19, the transactions are retail banking transactions that are to take place at a retail banking facility location. A customer initiates a transaction, block 250, using a computing device 251, which, for example, may be a smartphone. In this example, the customer associates the device by engaging in communications with a retail management computer or server, block 252, and the customer preferably registers the customer device 251 to identify the customer association with that device 251. The customer, as part of the transaction initiation, block 250, engages in communications with the retail management computer, block 252, to designate the transaction type that the customer desires to carry out at the retail location. The customer provides the details of the transaction, which in this example is a deposit of cash. The customer specifies the cash amount that the customer is going to deposit, and identifies the retail facility at which the deposit will be made. The system may be configured so that a customer may identify one or more transactions, or may be limited to a single transaction or transaction type per day, or may be able to specify a plurality of transactions for the same account, or for one or more other accounts of that customer. In this example, the retail management computer, block 252, receives and stores the transaction details. The customer travels to the retail facility and arrives, block 253. A sensor at the facility detects the customer via the customer device 251, block 254. The sensor communicates the customer device identification detected, block 255. Preferably, the sensor relays the customer device information to a retail computing component or kiosk, block 256. The retail computing component, block 256, may be a computing component, which preferably is situated at the retail facility (the computing component may be a kiosk, such as the kiosk represented by block 158 in FIG. 2). The retail computing component, block 256, is programmed with instructions for receiving and transmitting information and managing the equipment at the retail facility, such as, for example, mechanisms that are used to receive deposits (e.g., by opening a door or slot). The retail computing component, block 256, also may be used for processing and communicating information from sensors that interconnect with the consumer computing device. In the example represented in FIG. 19, the customer arrives at the facility, block 253, in a vehicle 260, but, according to some alternate implementations, also may arrive on foot, represented by the individual 261, or may depart the vehicle 260 and walk up to a deposit area or slot. Similar to other transactions depicted and described herein, the customer vehicle 260 or customer 261 is detected, block 254, and an event may be created and tagged with a time. The sensor relays the information, block 255, to the computing component or kiosk, block 256. The system, and preferably the computing component or kiosk, block 256, is configured to listen for a detection signal (e.g., from the sensor), and upon confirming the detection of the signal, block 257, communicates with the retail management computer, block 252, through a communication link, which may be a network, VPN, Internet, cellular, or other suitable connection over which information may be communicated. The retail computing component, block 256, preferably communicates the customer ID to the retail management component, block 252. The customer ID preferably may be a customer device ID based on the sensor detection of the device 251, block 254. Preferably, the customer has registered the device or created another association with the device that identifies the customer. The retail management computer, block 252, preferably has the details of the customer transaction from the prior engagement with the customer when the customer transaction was initiated, block 250. The retail management computer, block 252, preferably identifies the customer and processes the transaction details for that customer, block 268, based on the customer's initiated transaction, block 250. The retail management computer, block 252, preferably is programmed with instructions to communicate to the retail computing component, block 256, at the retail facility, instructions 269 for completing the transaction. The retail computing component, block 256, receives the instructions 269 and conducts the retail transaction at the retail facility, block 270, which, in this example, includes opening a deposit slot, block 271 to receive the deposit. The retail computing component, block 256, preferably, upon receipt of the communication providing the transaction detail, 269, from the retail management computer, block 252, generates an instruction to operate a mechanism, such as a solenoid, to open a slot door to provide access to the deposit bin. The customer places the deposit (cash and or other materials, envelope, slip, etc.) into the reception access slot, block 272. According to preferred embodiments, a deposit reception access sensor, block 273, may be provided to detect transactional activity, such as, for example, the receipt of materials within the slot. The deposit sensor, block 273, generates a signal that is communicated to or otherwise detected by the retail computing component, block 256. The retail computing component, block 256, may provide instructions to the solenoid to close the slot door after receiving materials within the slot (which may be after a preset time interval, or after providing an option to the customer via the customer device, or input at the deposit area, and receiving no response). Upon detection of completion of the transaction, the solenoid may be actuated to close the slot door. Additionally, or alternatively, the retail computing component, block 256, preferably communicates a transaction status, block 275, to the retail management computer, block 252, to signify that the deposit has been received, and/or that the transaction has been completed. There may be further options provided for determining whether the transaction was successful or was unsuccessful (where nothing was detected being received from the customer). In addition, a recording may be initiated to record the receipt of deposits within the deposit bin, so as to determine whether something was deposited and/or what was provided by the customer. The customer preferably receives an acknowledgement, block 277, from the retail management computer, block 252, (or alternatively, may receive an acknowledgement from the retail computing component, block 256). Upon completion of the transaction, the customer then departs the facility, block 278.

The system may be prepared for receiving multiple customers, where the system identifies customers, and may specify an order for transacting with customers, where multiple customers arrive at the same time. Alternatively, multiple deposit slots or transacting components may be provided, and the customer may be assigned to use a particular one of the designated transacting components. Specific facility instructions may be managed at the time the customer pre-designates the transaction (prior to arrival), or at the time of arrival, where a customer device is identified and an instruction is provided to make the transaction at a particular (or other) transacting component at that facility (e.g., slot 1 versus slot 2). Although the exemplary depiction in FIG. 19 describes the retail computing component, block 256, communicating an ID to the retail management computer, block 252, and then receiving transaction details, block 268, the transaction information 269 may be uploaded, downloaded, or pushed from the retail management computer, block 252, after or while carrying out the initiation of the transaction, block 251. The retail computing component, block 256, may already have the customer information and transaction information prior to the customer arrival at the retail facility location, so that when the customer device is detected, block 254, and the ID is relayed, block 255, to the retail computing component, block 256, the retail computing component, block 256, may implement the facility portion of the retail transaction, block 270. In addition, although the customer is shown receiving a completion or transaction status, block 277, from the retail management computer, block 252, in addition or alternatively, the retail computing component, block 256, may generate and provide information to a transacting customer, such as, for example, a transaction status, which it may communicate to the customer device 251. Upon completion of the transaction at the retail facility, the customer account information may be updated to reflect the status of the completed transaction.

According to an alternate embodiment, the pre-transactional initiation may be carried out using the transacting user's computing device which may connect to the retail management computer, block 252. The transactions may be implemented and completed at the retail facility location, through a connection between a computing device of the transacting user and the retail management computer, which interchange information. According to some implementations, the retail management computer, block 252, may issue a signal to the retail computing component, block 256, to operate components at the retail facility, such as, for example, a control mechanism that opens the slot door to accept a deposit.

In addition, although the sensors 117, 117', 118, 118' are depicted to identify the presence of activity within a lane, according to alternate embodiments, a sensor may be deployed to identify activity within one or more lanes. The lane activity alert generated from the sensor can be used to respond to the appropriate lane, where the personnel of the facility observe (through a window, camera screen display or other visual) lane in which the transacting user (e.g., customer) is present.

According to some embodiments, the system may be configured to manage and measure metrics of customers using the facility, including those making pre-designated transactions. For example, the types of transactions, times at which the transactions are made, time interval between transaction initiation and completion or arrival at the facility, as well as geographic location tracking, may be available for data collection and usage. The system may be designed to provide queries on the device screen of the user that may require the user to respond prior to or during completion of a transaction. A user that has initiated a transaction may receive reminder communications that an initiated transaction requires completion.

According to some embodiments, the system may be configured to provide remote hosting service for enterprise reporting and metrics. For example, the retail management component and/or retail computing component at the retail facility may provide specific transactional data that may be uploaded or otherwise shared with a remote hosting facility. The remote hosting facility may be a service provider of the notification system, or may be a separate entity altogether. According to some embodiments, the information from the retail computing component may be configured to obtain data and metrics without customer account information, or any protectable information, so that the metric data, regarding for example, types of transactions, completions of transactions, time of transactions, lanes, and the like may be communicated or made available to a remote hosting facility (which may be the retail establishment, or more preferably an entity other than the retail establishment).

Embodiments of the system may employ other types of sensors to provide notification of the facility and facility personnel of customer presence, for example, where a customer is in need of assistance. The sensors also are configured to provide a signal that may be read by the retail computing component so that alert notifications are generated and communicated to personnel at the retail facility. Some examples of sensors may include beacons as well as camera analytics. In addition, the customer may be provided with a customer app that provides a graphic that can be scanned at the retail facility (scanner), which may be in the form of a bar or QR code. In addition, additional motion detectors, which may be in addition to the sensors in the embodiments shown and described herein, may be employed to provide specific information about service areas or lanes.

Embodiments of the system also may be configured with a display, which preferably is a touch screen, on which is generated the sensor information in the form of an overview of the service areas (such as drive up lanes) and the customers that are being served. This embodiment may be implemented in facilities where multiple or more spread out customer service areas exist.

Although the reference is made to employees of the banking establishment, the users may include management, owners, and other personnel, and, certain individual users may be designated to receive alerts based on the lane or location of the activity where service is required or being requested. Although smartphones are referenced, the alerting system may be implemented with other computing devices, such as, for example, tablets, PDA's, and other portable computing devices. For example, a smart device may be used, or, according to some embodiments, a consumer may register one or more smart devices or computers, so that when the consumer arrives at a retail facility to transact using the consumer device, the consumer is not limited to a particular device. The implementation is illustrated in an exemplary depiction with two drive-up lanes, but the system may be employed with one, two, or other numbers of drive-up lanes. The computing component also may be referred to as a kiosk or a management computing component, and may be programmed with software that contains instructions to instruct a processing component, such as a processor, microprocessor, or microcontroller, of the computing component, to process the information, including sensor information, transaction data, time stamping, employee data, as well as control the collection of information from activities of customers, employees, and transactions that take place. The computing component (kiosk or management computing component) preferably is configured with software that provides the capability for a user, such as, an administrator or manager level personnel, to make changes to implement settings, permissions, and surveys that are provided for employees to respond to. In addition, the communications and exchanges of information between the computing component and the remote devices used by personnel may be encrypted to provide additional security. Alternatively, and in addition, according to some preferred embodiments, the system may be configured to manage transactions at a retail drive-up facility, where customer account information is not required to be shared or communicated by the system while managing the drive-up service using the system. For example, the video and audio, although not typical and not allowed in some states unless both parties consent, may be configured so that it is not stored, or so only the customer image is stored. The system also may be implemented in conjunction with vehicle drop offs and pick-ups for an establishment that may receive vehicles at a facility, or may lease or lend them to customers or employees. While the invention has been described with reference to specific embodiments, the description is illustrative and is not to be construed as limiting the scope of the invention. Various modifications and changes may occur to those skilled in the art without departing from the spirit and scope of the invention described herein, and as defined by the appended claims.

What is claimed is:

1. A method for managing retail transactions at a drive-up facility, comprising:
   a) detecting activity at a drive-up facility with a sensor;
   b) issuing an alert to one or more wireless computing components informing of the detected activity at the drive-up facility;
   c) acknowledging with said wireless computing component the receipt of said alert;
   d) configuring a plurality of wireless computing devices to communicate over a network with a computing component;
   e) configuring the computing component to communicate over a network with a plurality of wireless computing devices;
   f) communicating a transmission from the sensor with which the activity at the drive-up facility was detected in step a) to said computing component, wherein said transmission indicates the detected activity of step a);
   g) generating and communicating an alert alerting of detected activity to one or more of said plurality of wireless computing devices;
   h) communicating an acknowledgement of the alert by at least one of said plurality of wireless computing devices to which said alert in step g) was communicated;
   i) receiving with said computing component the acknowledgment of the alert from the at least one said wireless computing device of step h) that communicated the acknowledgement of the alert;
   j) generating and communicating to said plurality of wireless computing devices a cancellation instruction canceling the alert;
   k) wherein each of said plurality of wireless computing devices are configured for use by an employee, and wherein an employee using one of the said plurality of wireless computing devices is identified by an employee logon that uniquely identifies that employee; and
   l) monitoring the employee status of an employee from an employee's use of the respective one of the configured plurality of wireless computing devices, and determining whether the employee is handling a transaction;
   m) wherein generating and communicating said alert alerting of detected activity to said one or more of said plurality of wireless computing devices communicates said alert to the said one or more wireless computing devices that are not presently handling a transaction.

2. The method of claim 1, wherein, in step j), the said plurality of wireless computing devices to whom a cancellation instruction was communicated includes said plurality of wireless computing devices that did not communicate an acknowledgement of the alert in step h).

3. The method of claim 1, including:
   assigning from a plurality of retail transaction types, one or more retail transaction types that are to be handled at the drive-up facility;
   recording and storing an employee identification;
   assigning one or more employee capabilities to each employee and storing the one or more employee capabilities with said employee identification;
   wherein said one or more employee capabilities include one or more retail transaction types.

4. The method of claim 3,
   wherein detecting activity comprises detecting activity at at least one lane of the drive-up facility, and
   wherein communicating said alert comprises communicating the alert to each employee whose one or more employee capabilities includes one or more retail transaction types that includes the transaction type to be handled at the at least one lane at which activity has been sensed.

5. The method of claim 4, including:
   managing transactions at at least one lane of the drive-up facility, wherein said alert is communicated to each employee capable of handling the transaction at the at least one lane at which activity has been sensed who is not handling a transaction at the time said alert is communicated.

6. The method of claim 5,
   wherein communicating an alert to the one or more employees capable of handling the transaction comprises communicating said alert to each said employee capable of handling the transaction at the at least one lane at which activity has been sensed via a respective one of the configured plurality of wireless computing devices in step d).

7. The method of claim 6, including:
   monitoring the employee status from one of the said plurality of wireless computing devices for an employee using the said one of the plurality of wireless computing devices from the employee's employee logon that uniquely identifies that employee;
   determining whether the employee has completed handling a transaction, and, upon determining that the employee has completed handling the transaction, restoring the availability of the employee status upon completion of the employee's handling of a transaction to a status that the employee is available;
   wherein said employee status is restored for those transactions that the employee is capable of handling.

8. The method of claim 7,
   designating an employee preference order for transaction types, including at least one preference order where at least one first employee is designated as a preferred employee for handling at least one first transaction type, and where at least one second employee is designated as the next preferred employee for handling the said at least one first transaction type.

9. The method of claim 8, wherein said at least one first employee and said at least one second employee are selected from the employees whose status is indicated to be available.

10. The method of claim 3, including:
a) providing an account for a customer;
b) associating a customer and a customer computing device with the customer account;
c) initiating a retail transaction, d) wherein initiating the retail transaction includes communicating the details of the transaction that includes the retail location of the retail establishment where the retail transaction is to take place;
e) completing the transaction at a retail location of the retail establishment;
f) configuring the sensor to detect the transacting customer computing device associated with the customer; and
g) detecting the presence of the customer computing device that is associated with the customer and the customer computing device.

11. The method of claim 1,
wherein retail transacting equipment is provided at the drive-up facility, wherein the retail transacting equipment comprises one or more other devices, and wherein employees use said one or more other devices;
wherein monitoring the employee status is conducted by monitoring transactions conducted by that employee on one or more of (i) the employee associated wireless computing device or (ii) one or more other devices used by the employee to conduct transactions that communicate with the computing component.

12. The method of claim 1, including:
configuring one or more sensors to detect activity in a drive-up lane;
configuring a computing component to receive a signal generated from the one or more sensors when activity is detected in the drive-up lane;
designating one or more transaction types to be handled in the drive-up lane;
assigning a respective one of the plurality of wireless configured computing devices to an employee for use;
activating the respective one of the plurality of wireless computing devices to communicate with the computing component;
inputting an input into the respective one of the plurality of wireless computing devices to identify an employee using the wireless computing device, wherein the input comprises the employee logon;
assigning one or more employee capabilities to each employee and storing the one or more employee capabilities along with an employee identification;
wherein said one or more employee capabilities include one or more transaction types;
wherein activating comprises providing the input comprising the employee logon into said wireless computing device and identifying said employee identification from the input made into said wireless computing device;
wherein issuing the activity alert comprises issuing the activity alert to the plurality of configured wireless computing devices that have been activated with inputs that identify one or more employees designated to handle the transaction type by their respective one or more employee capabilities.

13. The method of claim 12, including generating and transmitting a communication to the computing component from one of the respective plurality of configured computing devices specifying that the activity alert has been accepted.

14. The method of claim 13, including, after the computing component receives the communication from one of the respective plurality of configured computing devices signaling that the activity alert has been accepted, generating and transmitting a communication to the other of the respective plurality of configured computing devices that received the activity alert, a signal cancelling the activity alert, the signal comprising the cancellation instruction.

15. The method of claim 12, including:
generating and transmitting a communication to the computing component from one of the respective plurality of configured computing devices specifying that the activity alert has been accepted; and
after the computing component receives the communication from one of the respective plurality of configured computing devices signaling that the activity alert has been accepted, generating and transmitting the cancellation instruction to the other of the respective plurality of configured computing devices that received the activity alert, a signal cancelling the activity alert.

16. The method of claim 1, including:
a) providing an account for a customer;
b) associating a customer and a customer computing device with the customer account;
c) initiating a retail transaction,
d) wherein initiating the retail transaction includes communicating the details of the transaction that includes the retail location of the retail establishment where the retail transaction is to take place;
e) completing the transaction at a retail location of the retail establishment;
f) configuring the sensor to detect the transacting customer computing device associated with the customer; and
g) detecting the presence of the customer computing device that is associated with the customer and the customer computing device.

17. A system for managing retail transactions at a drive-up facility to carry out the method of claim 1, the system comprising:
a) at least one sensor for detecting activity;
b) at least one computing component configured to receive communications from said sensor;
c) at least one wireless computing device configured to generate an alert upon receiving an alerting communication when said sensor detects activity;
d) a network through which communications between one or more of said sensor, said computing component and said wireless computing device are communicated;
e) wherein said at least one sensor includes at least one sensor placed to sense activity in a drive-up lane of the facility for detecting drive-up activity in the drive up lane;
f) wherein said computing component is configured with software that communicates an activity alert to the at least one wireless computing device, and wherein at least the one wireless computing device receives the activity alert and generates a service alert;
g) wherein said wireless computing device includes an actuator that is selectable for allowing the acceptance of the service alert;
h) wherein said wireless computing device is configured with software containing an instruction to generate and transmit a communication to the computing component when a service alert has been accepted;
i) wherein said computing component is configured with software containing instructions to monitor for activity alerts and service alert acceptances; and
j) wherein said computing component is configured with instructions to cancel the service alerts issued to the plurality of wireless computing devices, when the computing component receives a communication from one of the said plurality of wireless computing devices that a service alert has been accepted;
k) wherein said computing component is configured with instructions to designate one or more transaction types to be handled;
l) wherein said computing component is configured with instructions to assign the wireless configured computing device to an employee for use;
m) wherein the wireless computing device communicates with the computing component;
n) wherein the wireless computing device receives an input comprising the employee logon that identifies an employee using the wireless computing device;
o) wherein said computing component is configured with instructions to generate an activity alert when activity is detected at the drive-up facility;
p) wherein said computing component is configured with instructions to assign one or more employee capabilities to each employee and to store the one or more employee capabilities along with an employee identification;
q) wherein said one or more employee capabilities include one or more transaction types;
r) wherein said computing component is configured with instructions to activate the wireless computing device by receiving from the wireless computing device a communication of the input comprising the employee logon, and to identify an employee identification based on the input;
s) wherein said computing component is configured with instructions to issue the activity alert by issuing the activity alert to the plurality of configured wireless computing devices that have been activated with inputs that identify one or more employees designated to handle the transaction type by their respective one or more employee capabilities.

18. The system of claim 17,
wherein a customer account is provided for a customer;
wherein a customer computing device is associated with the customer account; and
wherein the sensor is configured to detect the customer computing device associated with the customer.

19. The system of claim 18,
wherein, when said customer computing device is present in the transacting area of the drive up lane, said at least one sensor is configured to exchange communications with said customer computing device through a short-range wireless interconnection protocol so as to at least identify the customer computing device.

20. The system of claim 18,
wherein the computing component comprises a kiosk,
wherein the sensor is linked for communication with the kiosk, said kiosk comprising a processing component with software configured with instructions to process and identify signals from the sensor that indicate that activity is being detected;
wherein the kiosk is linked for connection to a wireless communication component comprising an access point; and
wherein the kiosk software communicates alerts to one or more of the wireless computing devices actively available for communication through said wireless communication component.

21. The system of claim 17,
wherein the computing component comprises a kiosk,
wherein the sensor is linked for communication with the kiosk, said kiosk comprising a processing component with software configured with instructions to process and identify signals from the sensor that indicate that activity is being detected;
wherein the kiosk is linked for connection to a wireless communication component comprising an access point; and
wherein the kiosk software communicates alerts to one or more of the wireless computing devices actively available for communication through said wireless communication component.

22. The system of claim 17, including a survey engine that comprises software provided to obtain and store transaction metrics for retail transactions, said metrics comprising transaction type and time of transaction.

* * * * *